(12) United States Patent
Nelson et al.

(10) Patent No.: US 6,947,057 B2
(45) Date of Patent: Sep. 20, 2005

(54) RENDERING LINES WITH SAMPLE WEIGHTING

(75) Inventors: Scott R. Nelson, Pleasanton, CA (US); Michael F. Deering, Los Altos, CA (US); Nandini Ramani, Saratoga, CA (US); Mark Tian, Mountain View, CA (US); Patrick Shehane, Fremont, CA (US); Kevin Tang, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 417 days.

(21) Appl. No.: 09/752,297

(22) Filed: Dec. 29, 2000

(65) Prior Publication Data

US 2002/0000988 A1 Jan. 3, 2002

Related U.S. Application Data

(60) Provisional application No. 60/243,674, filed on Oct. 26, 2000, provisional application No. 60/189,994, filed on Mar. 17, 2000, and provisional application No. 60/175,384, filed on Jan. 11, 2000.

(51) Int. Cl.[7] ............ G06T 11/20; G09G 5/00; G06F 12/02
(52) U.S. Cl. ............ 345/611; 345/441; 345/443; 345/543; 345/544
(58) Field of Search ............ 345/611, 613, 345/615, 612, 443, 592, 606, 441, 544, 543

(56) References Cited

U.S. PATENT DOCUMENTS

| | | | | |
|---|---|---|---|---|
| 5,487,142 A | * | 1/1996 | Nakayama et al. | 345/443 |
| 5,544,294 A | * | 8/1996 | Cho et al. | 345/441 |
| 5,559,529 A | * | 9/1996 | Maher | 345/613 |
| 5,594,854 A | * | 1/1997 | Baldwin et al. | 345/441 |
| 5,673,376 A | * | 9/1997 | Ray et al. | 345/427 |
| 5,903,279 A | * | 5/1999 | Lee et al. | 345/443 |
| 5,940,049 A | * | 8/1999 | Hinman et al. | 353/20 |
| 6,133,901 A | * | 10/2000 | Law | 345/611 |
| 6,424,343 B1 | | 7/2002 | Deering et al. | |
| 6,429,877 B1 | * | 8/2002 | Stroyan | 345/611 |
| 6,501,483 B1 | * | 12/2002 | Wong et al. | 345/611 |
| 6,556,197 B1 | * | 4/2003 | Van Hook et al. | 345/419 |
| 6,606,093 B1 | * | 8/2003 | Gossett et al. | 345/441 |

* cited by examiner

Primary Examiner—Sumati Lefkowitz
Assistant Examiner—Scott Wallace
(74) Attorney, Agent, or Firm—Meyertons Hood Kivlin Kowert & Goetzel, P.C.; Jeffrey C. Hood; Mark K. Brightwell

(57) ABSTRACT

A graphics system and method for displaying lines on a display device. The system may comprise a sample buffer, a rendering unit and a sample-to-pixel calculation unit. The rendering unit may (a) generate a plurality of sample positions in a two-dimensional space, (b) determine a sample normal distance for each of the sample positions with respect to a line defined by the line-draw command, (c) assign sample values to the sample positions based on the sample normal distance of each of the sample positions, and (d) store the sample values in the sample buffer. The sample-to-pixel calculation unit may read sample values from the sample buffer, filter them to determine a pixel value, and transmit the pixel value to the display device. The rendering unit may render the line sample values with a narrower width to pre-compensate for the line-expanding effect of the filtering performed by the sample-to-pixel calculation unit.

24 Claims, 28 Drawing Sheets

RENDERING LINES WITH SAMPLE WEIGHTING

CROSS-REFERENCE TO RELATED APPLICATIONS

This application claims the benefit of U.S. Provisional Application No. 60/189,994, filed Mar. 17, 2000, titled "GRAPHICS SYSTEM HAVING A SUPER-SAMPLED SAMPLE BUFFER AND HAVING SINGLE SAMPLE PER PIXEL SUPPORT" by N. David Naegle, Scott R. Nelson, and Michael Deering.

This application claims the benefit of U.S. Provisional Application No. 60/175,384, filed on Jan. 11, 2000, titled "Photorealistic Hardware Antialiasing" and U.S. Provisional Application No. 60/243,674, filed on Oct. 26, 2000, titled "Renderig Lines With Sample Weighting".

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on a computer screen or display device. Early graphics systems were only responsible for taking what the processor produced as output and displaying it on the screen. In essence, they acted as simple translators or interfaces. Modern graphics systems, however, incorporate graphics processors with a great deal of processing power. The graphics systems now act more like coprocessors rather than simple translators. This change is due to the recent increase in both the complexity and amount of data being sent to the display device. For example, modem computer displays have many more pixels, greater color depth, and are able to display images with higher refresh rates than earlier models. Similarly, the images displayed are now more complex and may involve advanced rendering and visual techniques such as anti-aliasing and texture mapping.

As a result, without considerable processing power in the graphics system, the computer's system CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the CPU to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose microprocessor. While early graphics systems were limited to performing two-dimensional (2D) graphics, their functionality has increased to support three-dimensional (3D) wire-frame graphics, 3D solids, and now includes support for textures and special effects such as advanced shading, fogging, alpha-blending, and specular highlighting.

The rendering ability of 3D graphics systems has been improving at a breakneck pace. A few years ago, shaded images of simple objects could only be rendered at a few frames per second, but today's systems support rendering of complex objects at 60 Hz or higher. At this rate of increase, in the not too distant future, graphics systems will literally be able to render more pixels in "real-time" than a single human's visual system can perceive. While this extra performance may be useable in multiple-viewer environments, it may be wasted in the more common single-viewer environments. Thus, a graphics system is desired which is capable of utilizing the increased graphics processing power to generate images that are more realistic.

While the number of pixels and frame rate is important in determining graphics system performance, another factor of equal or greater importance is the visual quality of the image generated. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics systems render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain images that are more realistic, some prior art graphics systems have gone further by generating more than one sample per pixel. As used herein, the term "sample" refers to calculated color information that indicates the color, depth (z), and potentially other information, of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh to display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

In certain cases, filtering may generate undesirable results, for example, when filtering lines or other objects that have already been anti-aliased. Line segments drawn using rectangular grids, other than vertical and horizontal lines, typically appear jaggy without anti-aliasing. In order to make these lines appear less jaggy, prior to super-sampling/filtering techniques, anti-aliasing methods were used. However, when filtering is applied to lines that have already been anti-aliased, the lines may appear to be wider beyond a desirable level. Therefore, a method and system are desired to correctly render anti-aliased lines in a super-sampling/filtering environment.

SUMMARY OF THE INVENTION

The present invention comprises a computer graphics system that utilizes a super-sampled sample buffer and one or more programmable sample-to-pixel calculation units for refreshing the display. In one embodiment, the graphics system may have a graphics processor configured to render (or draw) the samples, a super-sampled sample buffer, and a sample-to-pixel calculation unit.

The graphics processor may generate a plurality of samples (based on a selected set of sample positions) and store the samples into a sample buffer. The graphics processor preferably generates and stores more than one sample for at least a subset of the pixel locations on the display. Thus, the sample buffer is a super-sampled (also referred to as "over-sampled") sample buffer that stores a number of samples that, in some embodiments, may be far greater than the number of pixel locations on the display. In other embodiments, the total number of samples may be closer to, equal to, or even less than the total number of pixel locations on the display device, but the samples may be more densely positioned in certain areas and less densely positioned in other areas.

The sample-to-pixel calculation unit is configured to read the samples from the super-sampled sample buffer and filter or convolve the samples into respective output pixels, wherein the output pixels are then provided to refresh the display. As used herein, the terms "filter" and "convolve" are used interchangeably and refer to mathematically manipulating one or more samples to generate a pixel (e.g., by averaging, by applying a convolution function, by summing, by applying a filtering function, by weighting the samples and then manipulating them, by applying a randomized function, etc.). The sample-to-pixel calculation unit selects one or more samples and filters them to generate an output pixel. The number of samples selected and or filtered by the sample-to-pixel calculation unit may be one or, in the preferred embodiment, greater than one, but this may vary depending upon the exact implementation.

In some embodiments, the number of samples used to form each pixel may vary. For example, the underlying average sample density in the sample buffer may vary, the extent of the filter may vary, and/or the number of samples for a particular pixel may vary due to stochastic variations in the sample density. In some embodiments, the average number of samples contributing to a pixel may vary on a per-pixel basis, on a per-scan line basis, on a per-region basis, on a per-frame basis, or the number may remain constant. The sample-to-pixel calculation unit may access the samples from the super-sampled sample buffer, perform a real-time filtering operation, and then provide the resulting output pixels to the display in real-time. The graphics system may operate without a conventional frame buffer, i.e., the graphics system does not utilize a conventional frame buffer that stores the actual pixel values that are being refreshed on the display. Note some displays may have internal frame buffers, but these are considered an integral part of the display device, not the graphics system. Thus, the sample-to-pixel calculation units may calculate each pixel for each screen refresh "on-the-fly". As used herein, the term "on-the-fly" refers to a function that is performed at or near the display device's refresh rate". For example, filtering samples "on-the-fly" means calculating enough output pixels at a rate high enough to support the refresh rate of a display device. "Real-time" means at, near, or above the human visual system's perception capabilities for motion fusion (how often a picture must be changed to give the illusion of continuous motion) and flicker fusion (how often light intensity must be changed to give the illusion of continuous). These concepts are further described in the book "Spatial Vision" by Russel L. De Valois and Karen K. De Valois, Oxford University Press, 1988.

Line-draw commands are typically among the graphics instructions received by the graphics system. A command for drawing a line on a display may provide, in one embodiment, coordinates for the two line ends, color information (e.g., R, G, B), as well as other attributes (such as an alpha transparency value, a depth z value, and texture coordinates, etc.).

In one set of embodiments, the graphics system may comprise a sample buffer, a rendering unit and a sample-to-pixel calculation unit. The rendering unit may be configured to:
 (a) generate a plurality of sample positions in a two-dimensional space,
 (b) determine a sample normal distance for each of the sample positions with respect to a line defined by the line-draw command,
 (c) assign sample values to the sample positions based on the sample normal distance of each of the sample positions, and
 (d) store the sample values in the sample buffer.

In one embodiment, the sample values comprise color values. In another embodiment, the sample values comprise transparency values. In yet another embodiment, the sample values comprises color values and transparency values.

The sample-to-pixel calculation unit may be configured to read one or more of the sample values from the sample buffer, operate on (e.g. spatially filter) the one or more sample values to determine a pixel value, and transmit the pixel value to a display device.

The sample normal distance of a sample may be defined as the perpendicular distance between the sample and the line segment. The rendering unit may compute the sample normal distance for a sample by determining a vertical displacement (or horizontal displacement) between the sample and the line segment, and multiplying the vertical distance (or horizontal displacement) by a correction factor which depends on the line of the line segment. The correction factor may be stored in a lookup table. The lookup table may contain correction factors for slope values spanning an interval such as [−1,1].

The rendering unit may evaluate a window function (e.g. by table lookup) for each of said sample positions based on the corresponding sample normal distances. The window function value thereby obtained may be used to determine the sample value (e.g. color value and/or transparency value) at the corresponding sample position. The window function achieves a smooth transition of sample values in the direction normal to the line segment. In one embodiment, the window function achieves a smooth transition of transparency values from totally opaque on the line segment to totally transparency at some normal distance away from the line segment. In another embodiment, the window function achieves a smooth transition of color values from a line color value on the line segment to background color value(s) at some distance away from the line segment.

The sample-to-pixel calculation units may perform filtering on sample values to generate pixel values. This filtering has an expanding effect on the width of the displayed lines. In some embodiments, the rendering unit may be configured to evaluate the window function on a scalar multiple of the sample normal distances instead of the sample normal distances themselves. In other words, the sample normal distances may be multiplied by an anti-aliasing correction factor to obtain a scaled distance value. The scaled distance value may be used to evaluate the window function. When the anti-aliasing correction factor is greater than one, the line as represented in terms of the sample values is narrower in the normal direction. The narrower line in terms of sample values pre-compensates for the line-expanding effect of the filtering in the sample-to-pixel calculation units. Thus, the line as displayed on screen may appear more consistent with a desired width. As the anti-aliasing correction factor is increased, the apparent width of the line on screen (e.g. on a display screen or a projection screen) is reduced.

The window function may have a wide variety of functional forms. In one embodiment, the window function is a Gaussian function. The window function may transition (not necessarily monotonically) from one to zero as the absolute value of sample normal distance increases from zero to some positive value.

In some embodiments, the anti-aliasing correction factor (ACF) may be controlled by user input. For example, in one embodiment, the graphics system couples to a host computer, and the host computer may support a graphical user interface through which the user may control the anti-aliasing correction factor. The user may supply control inputs (e.g. may manipulate a graphical icon using an input device such as a mouse) to increase and/or decrease the anti-aliasing correction factor until the size of lines displayed on screen have a desired width.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
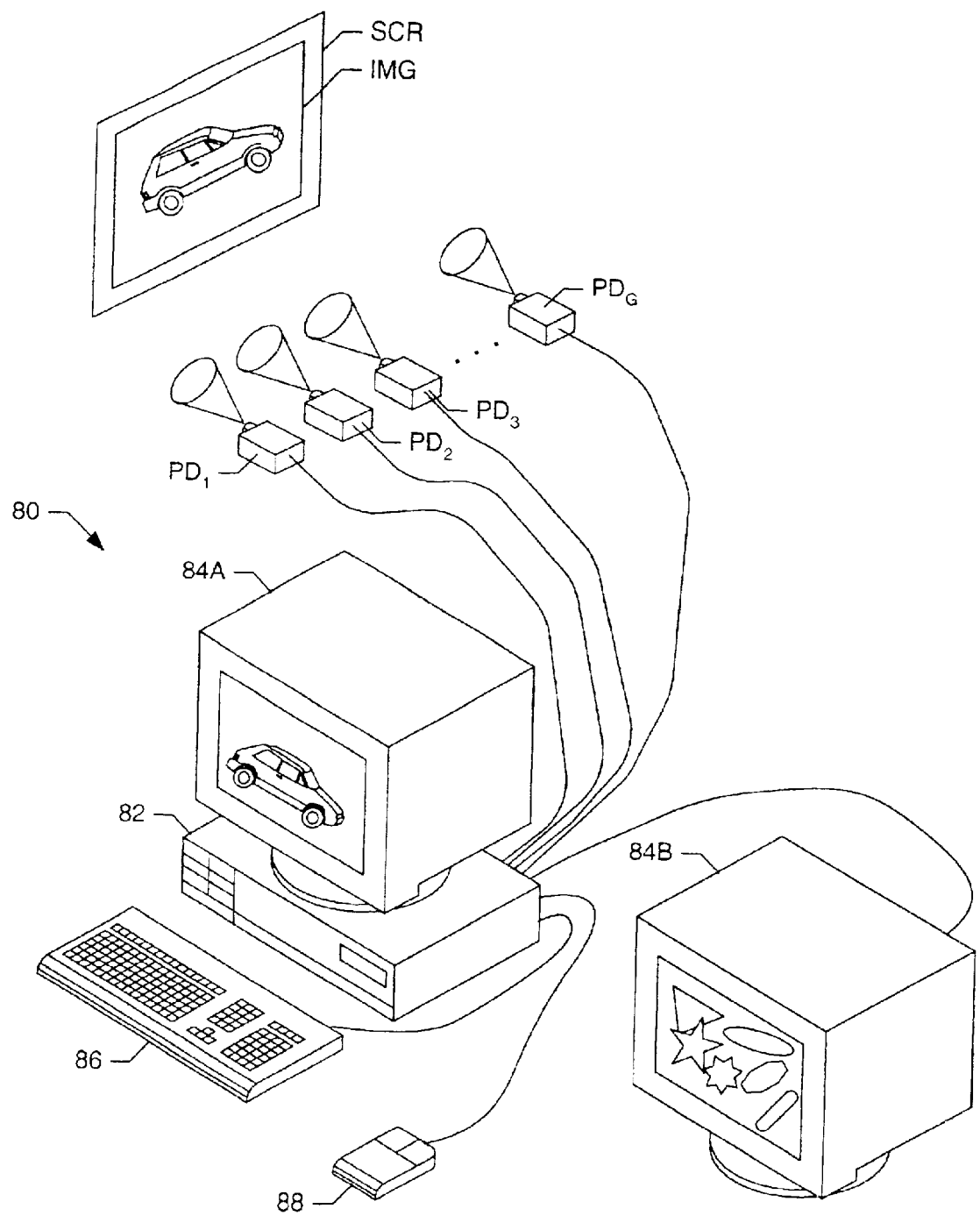
FIG. 1 illustrates a computer system which includes a graphics system for driving one or more display devices (including monitor devices and/or projection devices)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

FIG. 1—Computer System

FIG. 1 illustrates one embodiment of a computer system 80, which performs three-dimensional (3-D) graphics. Computer system 80 comprises a system unit 82 which may couple to one or more display devices such as monitor devices 84A and 84B and/or projection devices $PD_1$ through $PD_G$. Monitor devices 84A and 84B may be based on any of a variety of display technologies. For example, monitor devices 84A and 84B may be CRT displays, LCD displays, gas-plasma displays, digital micro-mirror displays, liquid crystal on silicon (LCOS) display, etc., or any combination thereof. Similarly, projection devices $PD_1$ through $PD_G$ may be realized by any of a variety of projection technologies. For example, projection devices $PD_1$ through $PD_G$ may be CRT-based projectors, LCD projectors, LightValve projectors, gas-plasma projectors, digital micromirror (DMM) projectors, LCOS projectors, etc., or any combination thereof. Monitor devices 84A and 84B are meant to represent an arbitrary number of monitor devices.

Various input devices may be connected to system unit 82, including a keyboard 86, a mouse 88, a video camera, a trackball, a digitizing tablet, a six-degree of freedom input device, a head tracker, an eye tracker, a data glove, body sensors, a touch-sensitive screen, etc. Application software may be executed by computer system 80 to display 3-D graphical objects on projection screen SCR and/or monitor devices 84A and 84B. It is noted that projection devices $PD_1$ through $PD_G$ may project their respective component images onto a surface other than a conventional projection screen, and/or onto surfaces that are curved (e.g. the retina of a human eye).

Figure 2:
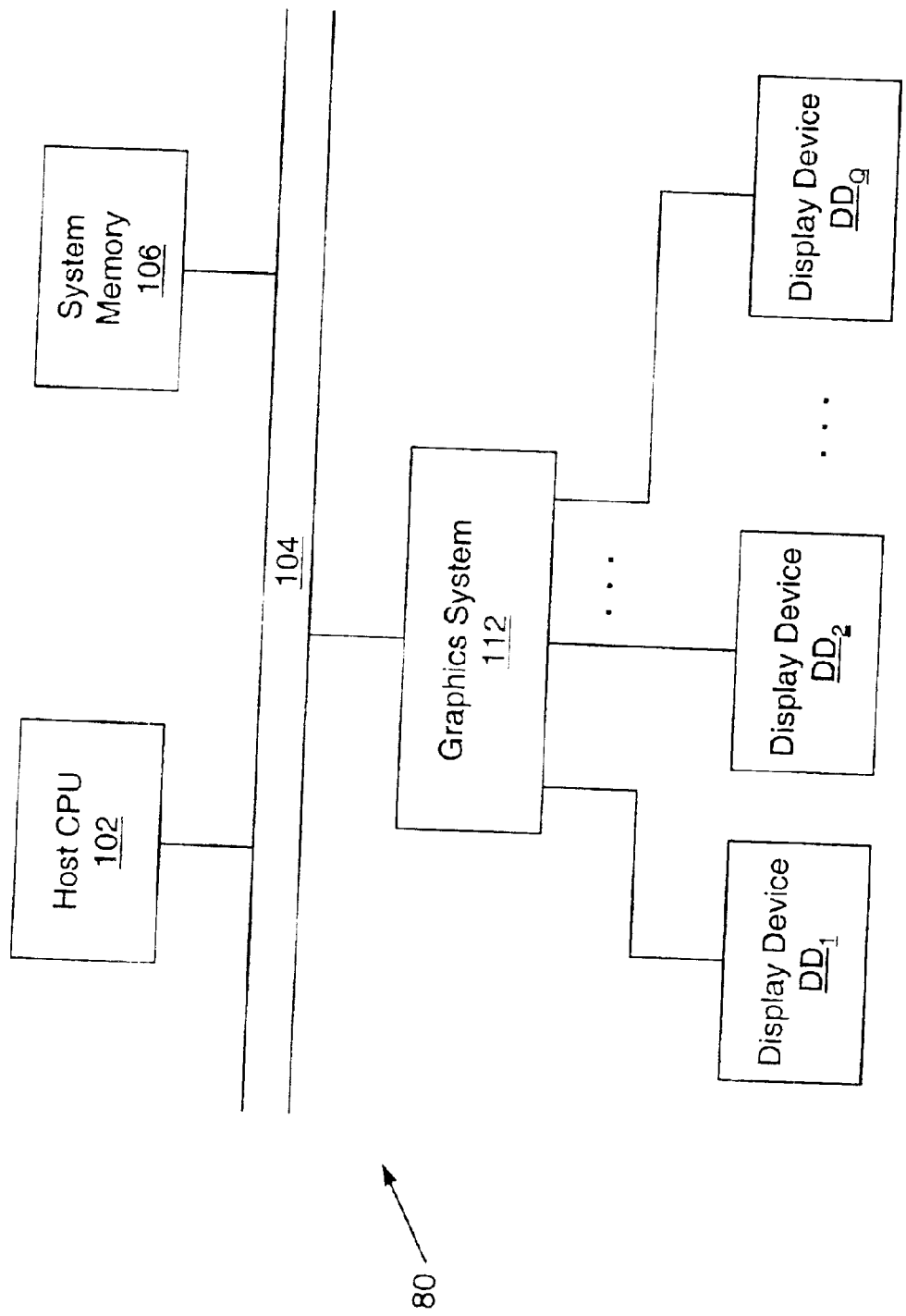
FIG. 2 is a simplified block diagram of the computer system of FIG. 1.

FIG. 2—Computer System Block Diagram

FIG. 2 presents a simplified block diagram for computer system 80. Computer system 80 comprises a host central processing unit (CPU) 102 and a 3-D graphics system 112 coupled to system bus 104. A system memory 106 may also be coupled to system bus 104. Other memory media devices such as disk drives, CD-ROM drives, tape drives, etc. may be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM) and/or random access memory (RAM)—such as static random access memory (SRAM), synchronous dynamic random access memory (SDRAM) and/or Rambus dynamic access memory (RDRAM).

System bus 104 may comprise one or more communication buses or host computer buses (e.g., for communication between host processors and memory subsystems). In addition, various peripheral devices and peripheral buses may be connected to system bus 104.

Figure 3A:
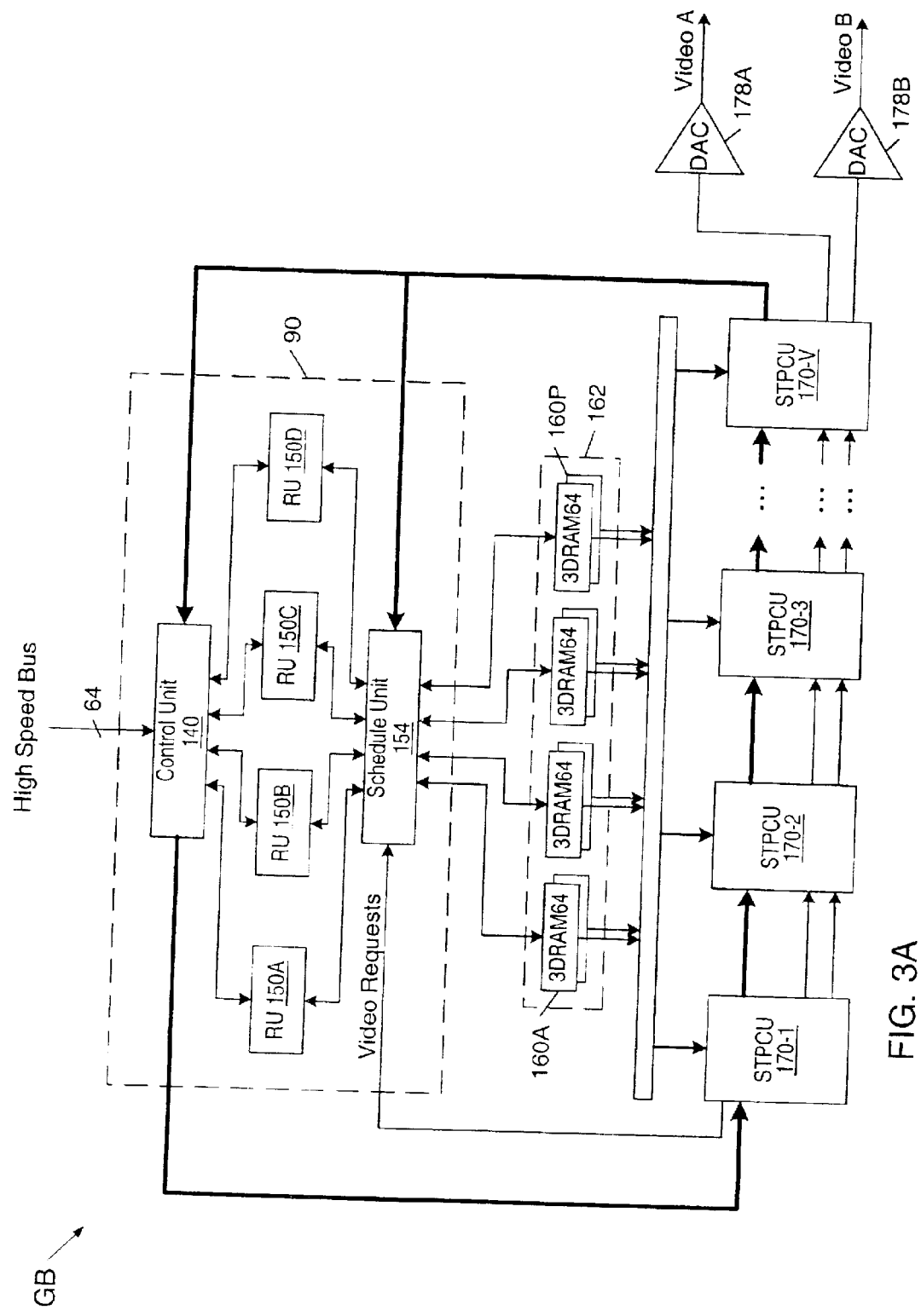
FIG. 3A is a block diagram illustrating one embodiment of a graphics board GB.

Graphics system 112 may comprise one or more graphics boards. The graphics boards may couple to system bus 104 by any of a variety of connectivity technologies (e.g. crossbar switches). The graphics boards may generate video signals for display devices $DD_1$ through $DD_Q$ in response to graphics commands and data received from one or more graphics applications executing on host CPU 102. Display devices $DD_1$ through $DD_Q$ may include monitor devices 84A and 84B, and projection device $PD_1$ through $PD_G$. FIG. 3A illustrates one embodiment of a graphics board GB for enhancing 3D-graphics performance.

Graphics board GB may couple to one or more busses of various types in addition to system bus 104. Furthermore, graphics board GB may couple to a communication port, and thereby, directly receive graphics data from an external source such as the Internet or a local area network.

Host CPU 102 may transfer information to/from graphics board GB according to a programmed input/output (I/O) protocol over system bus 104. Alternately, graphics board GB may access system memory 106 according to a direct memory access (DMA) protocol or through intelligent bus mastering.

A graphics application, e.g. an application conforming to an application programming interface (API) such as OpenGL® or Java® 3D, may execute on host CPU 102 and generate commands and data that define geometric primitives such as polygons for output on display devices $DD_1$ through $DD_Q$. Host CPU 102 may transfer this graphics data to system memory 106. Thereafter, the host CPU 102 may transfer the graphics data to graphics board GB over system bus 104. In another embodiment, graphics board GB may read geometry data arrays from system memory 106 using DMA access cycles. In yet another embodiment, graphics board GB may be coupled to system memory 106 through a direct port, such as an Advanced Graphics Port (AGP) promulgated by Intel Corporation.

Graphics board GB may receive graphics data from any of various sources including host CPU 102, system memory 106 or any other memory, external sources such as a network (e.g., the Internet) or a broadcast medium (e.g. television). While graphics board GB is described above as a part of computer system 80, graphics board GB may also be configured as a stand-alone device.

Graphics board GB may be comprised in any of various systems including a network PC, an Internet appliance, a game console, a virtual reality system, a CAD/CAM station, a simulator (e.g. an aircraft flight simulator), a television (e.g. an HDTV system or an interactive television system), or other devices which display 2D and/or 3D graphics.

As shown in FIG. 3A, graphics board GB may comprise a graphics processing unit (GPU) 90, a super-sampled sample buffer 162, and one or more sample-to-pixel calculation units 170-1 through 170-V. Graphics board GB may also comprise one or more digital-to-analog converters (DACs) 178A–B.

Graphics processing unit 90 may comprise any combination of processing technologies. For example, graphics processing unit 90 may comprise specialized graphics processors or calculation units, multimedia processors, DSPs, general-purpose processors, reconfigurable logic (e.g. programmable gate arrays), dedicated ASIC chips, etc.

In one embodiment, graphics processing unit 90 may comprise one or more rendering units 150A–D. Graphics processing unit 90 may also comprise one or more control units 140, and one or more schedule units 154. Sample buffer 162 may comprise one or more sample memories 160A–160P.

A. Control Unit 140

Control unit 140 operates as the interface between graphics board GB and CPU 102, i.e. controls the transfer of data between graphics board GB and CPU 102. In embodiments where rendering units 150A–D comprise two or more rendering units, control unit 140 may also divide a stream of graphics data received from CPU 102 and/or system memory 106 into a corresponding number of parallel streams that are routed to the individual rendering units.

The graphics data stream may be received from CPU 102 and/or system memory 106 in a compressed form. Graphics data compression may advantageously reduce the required transfer bandwidth for the graphics data stream. In one embodiment, control unit 140 may be configured to split and route the received data stream to rendering units 150A–D in compressed form.

The graphics data may comprise graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996.

It is noted that the embodiments and examples presented herein are described in terms of polygons (e.g. triangles) for the sake of simplicity. However, any type of graphics primitive may be used instead of or in addition to polygons in these embodiments and examples.

B. Rendering Units 150A–D

Each of rendering units 150A–D (also referred to herein as draw units) may receive a stream of graphics data from control unit 140, and perform a number of functions in response to the graphics stream. For example, each of rendering units 150A–D may be configured to perform decompression (if the received graphics data is presented in compressed form), transformation, clipping, lighting, texturing, depth cueing, transparency processing, setup, and virtual screen-space rendering of graphics primitives occurring within the graphics stream. Each of rendering units 150A–D may comprise one or more processors (e.g. specialized graphics processors, digital signal processors, general purpose processors, etc.) and/or specialized circuitry (e.g. ASIC chips).

Figure 3B:
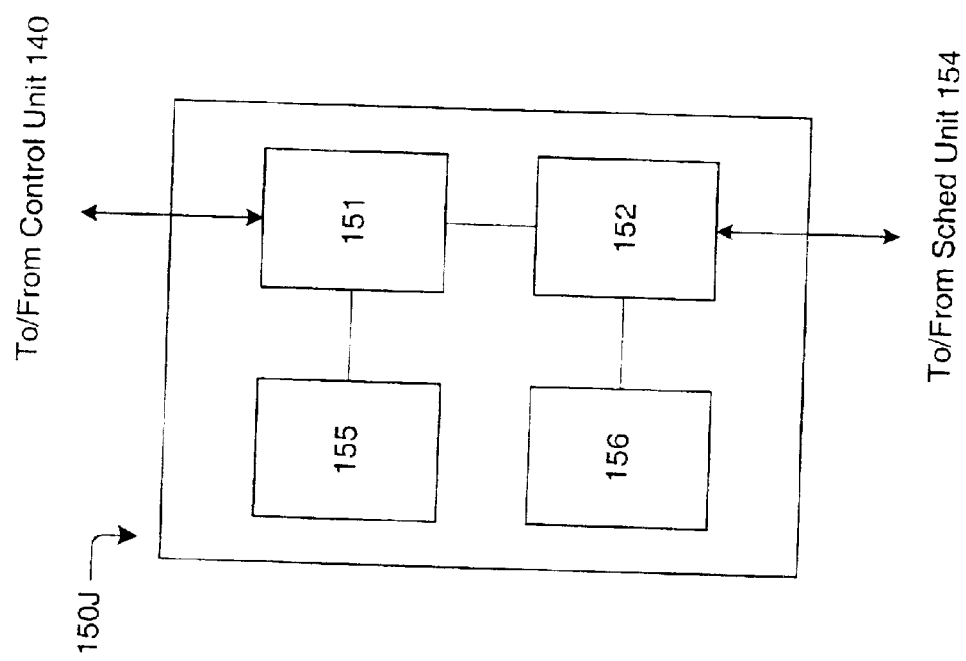
FIG. 3B is a block diagram illustrating one embodiment of a rendering unit comprised within graphics system 112.

In one embodiment, each of rendering units 150A–D may be configured in accord with rendering unit 150J illustrated in FIG. 3B. Rendering unit 150J may comprise a first rendering unit 151 and second rendering unit 152. First rendering unit 151 may be configured to perform decompression (for compressed graphics data), format conversion, transformation, lighting, etc. Second rendering unit 152 may be configured to perform setup computations, virtual screen space rasterization, sample rendering, etc. First rendering unit 151 may be coupled to first data memory 155, and second rendering unit 152 may be coupled to second data memory 156. First data memory 155 may comprise RDRAM, and second data memory 156 may comprise SDRAM. First rendering unit 151 may comprise one or more processors such as media processors. Second rendering unit 152 may comprise a dedicated ASIC chip.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). Rendering units 150A–D may also be configured to decode graphics data that has been compressed using geometric compression. Geometric compression of 3D graphics data may achieve significant reductions in data size while retaining most of the image quality. A number of methods for compressing and decompressing 3D geometry are described in:

U.S. Pat. No. 5,793,371, application Ser. No. 08/511,294, filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object,".

In embodiments of graphics board GB that support decompression, the graphics data received by a rendering unit (i.e. any of rendering units 150A–D) may be decompressed into one or more graphics "primitives" which may then be rendered. The term primitive refers to geometric components that define the shape of an object, e.g., points, lines, triangles, polygons, polyhedra, or free-form surfaces in three dimensions.

Rendering units 150A–D may be configured to perform transformation. Transformation refers to applying a geometric operation to a primitive or an object comprising a set of primitives. For example, an object represented by a set of vertices in a local coordinate system may be embedded with arbitrary position, orientation, and size in world space using an appropriate sequence of translation, rotation, and scaling transformations. Transformation may also comprise reflection, skewing, or any other affine transformation. More generally, transformations may comprise non-linear operations.

Rendering units 150A–D may be configured to perform lighting. Lighting refers to calculating the illumination of the objects. Lighting computations result in an assignment of color and/or brightness to objects or to selected points (e.g. vertices) on objects. Depending upon the shading algorithm being used (e.g., constant, Gouraud, or Phong shading), lighting may be evaluated at a number of different locations. For example, if constant shading is used (i.e., the lighted surface of a polygon is assigned a constant illumination value), then the lighting need only be calculated once per polygon. If Gouraud shading is used, then the lighting is calculated once per vertex. Phong shading calculates the lighting on a per-sample basis.

Rendering units 150A–D may be configured to perform clipping. Clipping refers to the elimination of primitives or portions of primitives, which lie outside a clipping region (e.g. a two-dimensional viewport rectangle). For example, the clipping of a triangle to the two-dimensional viewport may result in a polygon (i.e. the polygon which lies interior to the triangle and the rectangle). The resultant polygon may be fragmented into sub-primitives (e.g. triangles). In the preferred embodiment, only primitives (or portions of primitives) which survive the clipping computation are rendered in terms of samples.

Rendering units 150A–D may be configured to perform virtual screen space rendering. Virtual screen space rendering refers to calculations that are performed to generate samples for graphics primitives. For example, the vertices of a triangle in 3-D may be projected onto the 2-D viewport. The projected triangle may be populated with samples, and ordinate values (e.g. red, green, blue, alpha, Z, etc.) may be assigned to the samples based on the corresponding ordinates values already determined for the projected vertices. (For example, the red value for each sample in the projected triangle may be interpolated from the known red values of the vertices.) These sample ordinate values for the projected triangle may be stored in sample buffer 162. A virtual image accumulates in sample buffer 162 as successive primitives are rendered. Thus, the 2-D viewport is said to be a virtual screen on which the virtual image is rendered. The sample ordinate values comprising the virtual image are stored into sample buffer 162. Points in the 2-D viewport are described in terms of virtual screen coordinates X and Y, and are said to reside in virtual screen space.

When the virtual image is complete, e.g., when all graphics primitives have been rendered, sample-to-pixel calculation units 170 may access the samples comprising the virtual image, and may filter the samples to generate pixel ordinate values (e.g. red, green, blue, alpha, etc.). In other words, the sample-to-pixel calculation units 170 may perform a spatial convolution of the virtual image with respect to a convolution kernel C(X,Y) to generate pixel ordinate values. For example, a sample-to-pixel calculation unit may compute a red value $R_p$ for a pixel P at any location $(X_p,Y_p)$ in virtual screen space based on the relation $$R_p = \frac{1}{E}\sum C(X_i - X_p, Y_i - Y_p)R(X_i, X_i),$$

where the summation is evaluated at sample positions $(X_i, Y_i)$ in a neighborhood of location $(X_p,Y_p)$, and where $R(X_i,Y_i)$ are the red values corresponding to sample positions $(X_i,Y_i)$. Since convolution kernel C(X,Y) may be non-zero only in a neighborhood of the origin, the displaced kernel $C(X-X_p,Y-Y_p)$ may take non-zero values only in a neighborhood of location $(X_p,Y_p)$. Similar summations to compute other pixel ordinate values (e.g. green, blue, alpha, etc.) in terms of the corresponding sample ordinate values may be performed. In the preferred embodiment, some or all of the pixel ordinate value summations may be performed in parallel.

The value E is a normalization value that may be computed according to the relation $$E=\Sigma C(X_i-X_p, Y_i-Y_p),$$

where the summation is evaluated for the same samples $(X_i,Y_i)$ as in the red pixel value summation above. The summation for the normalization value E may be performed in parallel with the red, green, blue, and/or alpha pixel value summations. The location $(X_p,Y_p)$ may be referred to as a pixel center, or a pixel origin. The pixel ordinate values (e.g. RGB) may be presented to one or more of display devices $DD_1$ through $DD_Q$.

In the embodiment of graphics board GB shown in FIG. 3A, rendering units 150A–D compute sample values instead of pixel values. This allows rendering units 150A–D to perform super-sampling, i.e. to compute more than one sample per pixel. Super-sampling is discussed more thoroughly below. More details on super-sampling are discussed in the following books:

"Principles of Digital Image Synthesis" by Andrew S. Glassner, 1995, Morgan Kaufman Publishing (Volume 1);

"The Renderman Companion" by Steve Upstill, 1990, Addison Wesley Publishing; and "Advanced Renderman: Creating Cgi for Motion Pictures (Computer Graphics and Geometric Modeling)" by Anthony A. Apodaca and Larry Gritz, Morgan Kaufmann Publishers, c1999, ISBN: 1558606181.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units 170.

It is noted that the 2-D viewport and the virtual image, which is rendered with samples into sample buffer 162, may correspond to an area larger than the area which is physically displayed via display devices $DD_1$ through $DD_Q$. For example, the 2-D viewport may include a viewable subwindow. The viewable subwindow may represent displayable graphics information, while the marginal area of the 2-D viewport (outside the viewable subwindow) may allow for various effects such as panning and zooming. In other words, only that portion of the virtual image which lies within the viewable subwindow gets physically displayed. In one embodiment, the viewable subwindow equals the whole of the 2-D viewport. In this case, all of the virtual image gets physically displayed.

C. Data Memories

In some embodiments, each of rendering units 150A–D may be configured with two memories similar to rendering unit 150J of FIG. 3B. First memory 155 may store data and instructions for rendering unit 151. Second memory 156 may store data and/or instructions for second rendering unit 152. While implementations may vary, in one embodiment memories 155 and 156 may comprise two 8 MByte SDRAMs providing 16 MBytes of storage for each rendering unit 150A–D. Memories 155 and 156 may also comprise RDRAMs (Rambus DRAMs). In one embodiment, RDRAMs may be used to support the decompression and setup operations of each rendering unit, while SDRAMs may be used to support the draw functions of each rendering unit.

D. Schedule Unit

Schedule unit 154 may be coupled between rendering units 150A–D and sample memories 160A–P. Schedule unit 154 is configured to sequence the completed samples and store them in sample memories 160A–P. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–P, which are configured to store the plurality of samples generated by rendering units 150A–D. As used herein, the term "sample buffer" refers to one or more memories which store samples. As previously noted, samples may be filtered to form each pixel ordinate value. Pixel ordinate values may be provided to one or more of display devices $DD_1$ through $DD_Q$. Sample buffer 162 may be configured to support super-sampling, critical sampling, or sub-sampling with respect to pixel resolution. In other words, the average distance between adjacent samples in the virtual image (stored in sample buffer 162) may be smaller than, equal to, or larger than the average distance between adjacent pixel centers in virtual screen space. Furthermore, because the convolution kernel C(X,Y) may take non-zero functional values over a neighborhood which spans several pixel centers, a single sample may contribute to several pixels.

Sample memories 160A–P may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each of sample memories 160A–P may store up to sixteen samples per pixel.

3DRAM-64 memories are specialized memories configured to support full internal double buffering with single-buffered Z in one chip. The double-buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexor that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer with eight samples per pixel.

Since the 3DRAM-64 memories are internally double-buffered, the input pins for each of the two frame buffers in the double-buffered system are time multiplexed (using multiplexors within the memories). The output pins may be similarly time multiplexed. This allows reduced pin count while still providing the benefits of double buffering. 3DRAM-64 memories further reduce pin count by not having Z output pins. Since Z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a Z comparison, and then writing data back in. Instead, the data may be simply written into the 3DRAM-64 memory, with the memory performing the steps described above internally.

Each of rendering units 150A–D may be configured to generate a plurality of sample positions according to one or more sample positioning schemes. For example, in one embodiment, samples may be positioned on a regular grid. In another embodiment, samples may be positioned based on perturbations (i.e. displacements) from a regular grid. This perturbed-regular grid-positioning scheme may generate random sample positions if the perturbations are random or pseudo-random values. In yet another embodiment, samples may be randomly positioned according to any of a variety of methods for generating random number sequences.

The sample positions (or offsets that are added to regular grid positions to form the sample positions) may be read from a sample position memory (e.g., a RAM/ROM table). Upon receiving a polygon that is to be rendered, a rendering unit may determine which samples fall within the polygon based upon the sample positions. The rendering unit may render the samples that fall within the polygon, i.e. interpolate ordinate values (e.g. color values, alpha, depth, etc.) for the samples based on the corresponding ordinate values already determined for the vertices of the polygon. The rendering unit may then store the rendered samples in sample buffer 162. Note as used herein the terms render and draw are used interchangeably and refer to calculating ordinate values for samples.

F. Sample-to-pixel Calculation Units

Sample-to-pixel calculation units 170-1 through 170-V (collectively referred to as sample-to-pixel calculation units 170) may be coupled between sample memories 160A–P and DACs 178A–B. Sample-to-pixel calculation units 170 are configured to read selected samples from sample memories 160A–P and then perform a filtering operation (e.g. a convolution) on the samples to generate the output pixel values which are provided to one or more of DACs 178A–B. Sample-to-pixel calculation units 170 may be programmable to perform different filter functions at different times depending upon the type of output desired.

In one embodiment, sample-to-pixel calculation units 170 may implement a super-sample reconstruction band-pass filter to convert the super-sampled sample buffer data (stored in sample memories 160A–P) to pixel values. The support of the band-pass filter may cover a rectangular area in virtual screen space which is $L_p$ pixels high and $W_p$ pixels wide. Thus, the number of samples covered by the band-pass filter is approximately equal to $H_p W_p S$, where S is the number of samples per pixel. A variety of values for $L_p$, $W_p$ and S are contemplated. For example, in one embodiment of the band-pass filter $L_p=W_p=5$. It is noted that with certain sample positioning schemes (see the discussion attending FIGS. 4, 5A & 5B), the number of samples that fall within the filter support may vary as the filter center (i.e. pixel center) is moved in the virtual screen space.

In other embodiments, sample-to-pixel calculation units 170 may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters. For example, the filtering operations may comprise convolution with a box filter, a tent filter, a cylindrical filter, a cone filter, a Gaussian filter, a Catmull-Rom filter, a Mitchell-Netravali filter, a windowed sinc filter, etc., or any combination thereof. Furthermore, the support of the filters used by sample-to-pixel calculation units 170 may be circular, elliptical, rectangular (e.g. square), triangular, hexagonal, etc.

Sample-to-pixel calculation units 170 may also be configured with one or more of the following features: color look-up using pseudo color tables, direct color, inverse gamma correction, and conversion of pixels to non-linear light space. Other features of sample-to-pixel calculation units 170 may include programmable video timing generators, programmable pixel clock synthesizers, cursor generators, and crossbar functions.

Once the sample-to-pixel calculation units 170 have computed color values for pixels, e.g. pixels in a scan line, the pixels may output to one or more video output channels through DACs 178A–B.

G. Digital-to-Analog Converters

Digital-to-Analog Converters (DACs) 178A–B, collectively referred to as DACs 178, operate as the final output stage of graphics board GB. DACs 178 translate digital pixel data received from sample-to-pixel calculation units 170 into analog video signals. DAC 178A couples to output video channel A, and DAC 178B couples to output video channel B. DAC 178A may receive a first stream of digital pixel data from one or more of sample-to-pixel calculation units 170, and converts the first stream into a first video signal which is asserted onto output video channel A. Similarly, DAC 178B may receive a second stream of digital pixel data from one or more of sample-to-pixel calculation units 170, and converts the second stream into a second video signal which is asserted onto output video channel B.

In the preferred embodiment, sample-to-pixel calculation units 170 provide pixel values to DACs 178 without an intervening frame buffer. However, in one alternate embodiment, sample-to-pixel calculation units 170 output the pixel values to a frame buffer prior to display.

In one embodiment, some or all of DACs 178 may be bypassed or omitted in order to output digital pixel data in lieu of analog video signals. This may be useful where some or all of display devices $DD_1$ through $DD_Q$ are based on a digital technology (e.g., an LCD-type display, an LCOS display, or a digital micro-mirror display).

In the preferred embodiment, multiple graphics boards may be chained together so that they share the effort of generating video data for a display device. Thus, in the preferred embodiment, graphics board GB includes a first interface for receiving one or more digital video streams from any previous graphics board in the chain, and a second interface for transmitting digital video streams to any subsequent graphics board in the chain.

It is noted that various embodiments of graphics board GB are contemplated with varying numbers of rendering units, schedule units, sample-to-pixel calculation units, sample memories, more or less than two DACs, more or less than two video output channels, etc.

Figure 5B:
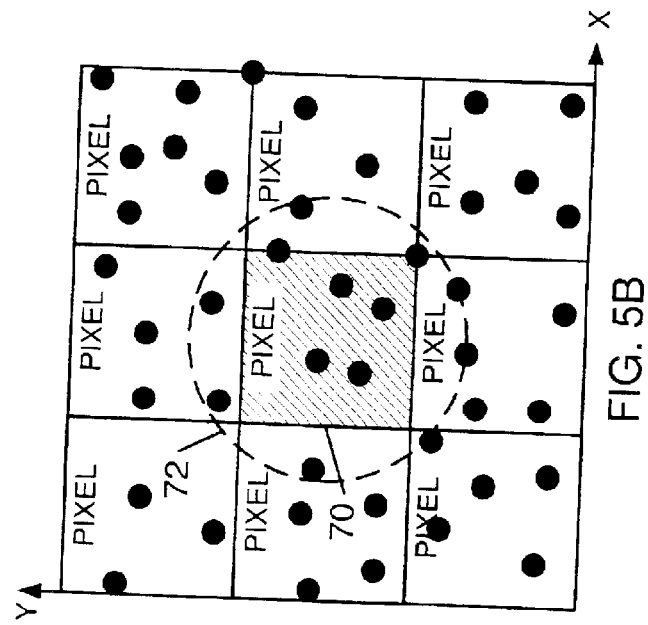
FIG. 5B illustrates one embodiment of a random distribution of samples in a two-dimensional viewport.
Figure 4:
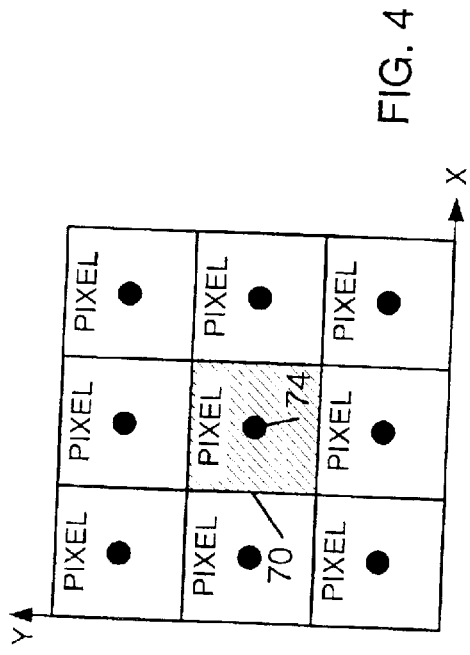
FIG. 4 illustrates one embodiment of a "one sample per pixel" configuration for computation of pixel values.
Figure 5A:
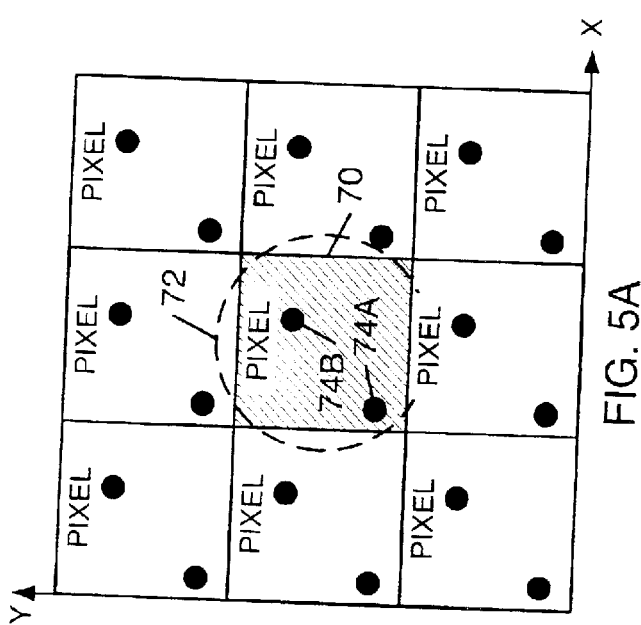
FIG. 5A illustrates one embodiment of super-sampling.

FIGS. 4, 5A, 5B—Super-sampling

FIG. 4 illustrates a portion of virtual screen space in a non-super-sampled embodiment of graphics board GB. The dots denote sample locations, and the rectangular boxes superimposed on virtual screen space indicate the boundaries between pixels. Rendering units 150A–D may be configured to position one sample in the center of each pixel, and to compute values of red, green, blue, Z, etc. for the samples. For example, sample 74 is assigned to the center of pixel 70. Although rendering units 150A–D may compute values for only one sample per pixel, sample-to-pixel calculation units 170 may compute output pixel values based on multiple samples, e.g. by using a convolution filter whose support spans several pixels.

Turning now to FIG. 5A, an example of one embodiment of super-sampling is illustrated. In this embodiment, rendering units 150A–D compute two samples per pixel. The samples are distributed according to a regular grid. Even though there are more samples than pixels in FIG. 5A, sample-to-pixel calculation units 170 could compute output pixel values using one sample per pixel, e.g. by throwing out all but the sample nearest to the center of each pixel. However, a number of advantages arise from computing pixel values based on multiple samples.

A support region 72 is superimposed over pixel 70, and illustrates the support of a filter which is localized at pixel 70. The support of a filter is the set of locations over which the filter (i.e. the filter kernel) takes non-zero values. In this example, the support region 72 is a circular disc. A sample-to-pixel calculation unit may perform a filtering operation using any of a variety of filters which have region 72 as their support region. Thus, the sample-to-pixel calculation unit may compute the output pixel values (e.g. red, green, blue and Z values) for pixel 70 based only on samples 74A and 74B, because these are the only samples which fall within region 72. This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70. More generally, the filtering operation may generate a weighted sum of the values of samples 74A–B, where the contribution of each sample is weighted according to some function of the sample's position (or distance) with respect to the center of pixel 70. The filter, and thus support region 72, may be repositioned for each output pixel being calculated. In other words, the filter center may visit the center of each output pixel for which pixel values are to be computed. Other filters and filter positioning schemes are also possible and contemplated.

In the example of FIG. 5A, there are two samples per pixel. In general, however, there is no requirement that the number of samples be related to the number of pixels. The number of samples may be completely independent of the number of pixels. For example, the number of samples may be smaller than the number of pixels. (This is the condition that defines sub-sampling).

Turning now to FIG. 5B, another embodiment of super-sampling is illustrated. In this embodiment, the samples are positioned randomly. Thus, the number of samples used to calculate output pixel values may vary from pixel to pixel. Rendering units 150A–D calculate color information at each sample position.

FIGS. 6–13—Super-sampled Sample Buffer with Real-time Convolution

Figure 6:
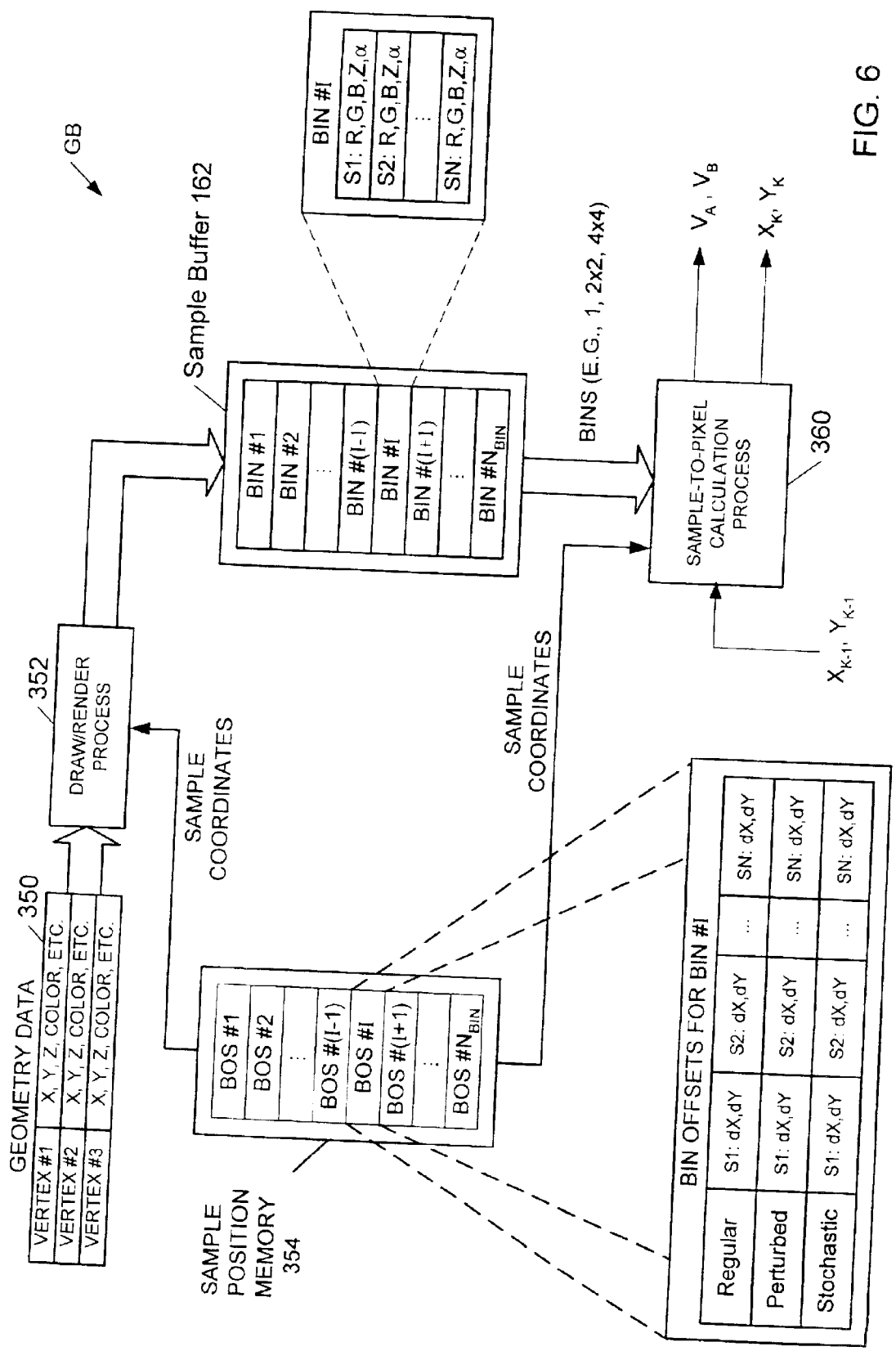
FIG. 6 illustrates one embodiment for the flow of data through graphics board GB.

FIG. 6 illustrates one embodiment for the flow of data through one embodiment of graphics board GB. As the figure shows, geometry data 350 is received by graphics board GB and used to perform draw process 352. The draw process 352 is implemented by graphics processing unit 90, i.e. by one or more of control unit 140, rendering units 150A–D, and schedule unit 154. Geometry data 350 comprises data for one or more polygons. Each polygon comprises a plurality of vertices (e.g., three vertices in the case of a triangle), some of which may be shared among multiple polygons. Data such as x, y, and Z coordinates, color data, lighting data and texture map information may be included for each vertex.

In addition to the vertex data, draw process 352 (which may be performed by each of rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of ordinate values (e.g. red, green, blue, Z, alpha, and/or depth of field information) for each of these samples based on their respective positions within the polygon. For example, the Z value of a sample that falls within a triangle may be interpolated from the known Z values of the three vertices. Each set of computed sample ordinate values may be stored into sample buffer 162.

In one embodiment, sample position memory 354 may be embodied within rendering units 150A–D. In another embodiment, sample position memory 354 may be realized as part of as a separate memory, external to rendering units 150A–D.

Sample position memory 354 may store sample positions in terms of their virtual screen coordinates (X,Y). Alternatively, sample position memory 354 may be configured to store only offsets dX and dY for the samples with respect to positions on a regular grid. Storing only the offsets may use less storage space than storing the entire coordinates (X,Y) for each sample. A dedicated sample position unit (not shown) may read and process the sample position information stored in sample position memory 354 to generate sample positions. More detailed information on the computation of sample positions is included below (see description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 6, sample position memory 354 may be configured to generate sample offsets according to a number of different sample-positioning schemes such as a regular grid scheme, a perturbed-regular grid scheme, or a random (i.e. stochastic) positioning scheme. Graphics board GB may receive an indication from the host operating system, device driver, or the geometry data 350 that indicates which type of sample positioning scheme is to be used. Thus, sample position memory 354 is configurable or programmable to generate sample position information according to one or more different schemes. More detailed information on several sample-positioning schemes is provided below. See description of FIG. 8.

In one embodiment, sample position memory 354 may comprise a RAM/ROM that contains stochastically determined sample points or sample offsets. Thus, the density of samples in virtual screen space may not be uniform when observed at small scale. Two bins with equal area centered at different locations in virtual screen space may contain different numbers of samples. As used herein, the term "bin" refers to a region or area in virtual screen space.

An array of bins may be superimposed over virtual screen space, i.e. the 2-D viewport, and the storage of samples in sample buffer 162 may be organized in terms of bins. Sample buffer 162 may comprise an array of memory blocks which correspond to the bins. Each memory block may store the sample ordinate values (e.g. red, green, blue, Z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport ranges from (0000,0000) to (FFFF,FFFF) in hexadecimal virtual screen coordinates. This 2-D viewport may be over-laid with a rectangular array of bins whose lower-left corners reside at the locations (XX00,YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample ordinate values for up to 16 samples, and that the set of sample ordinate values for each sample comprises 4 bytes. In this case, the address of the memory block corresponding to the bin located at (XX00,YY00) may be simply computed by the relation BinAddr=(XX+YY*256)*16*4. For example, the sample S=(1C3B,23A7) resides in the bin located at (1C00,2300). The set of ordinate values for sample S is then stored in the memory block residing at address 0x8C700=(0x231C)(0x40) in sample buffer 162. The number of bins and numerical ranges given in this example are not meant to be limiting.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the spatial bins in virtual screen space and their corresponding memory blocks may be referred to simply as "bins". The context will determine whether a memory bin or a spatial bin is being referred to.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample-positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. (Other offsets are also possible, e.g., a time offset, a Z-offset, etc.) When added to a bin position, each pair defines a particular position in virtual screen space, i.e. the 2-D viewport. To improve read access times, sample position memory 354 may be constructed in a wide/parallel manner so as to allow the memory to output more than one sample position per read cycle.

Once the sample positions have been read from sample position memory 354, draw process 352 selects the samples that fall within the polygon currently being rendered. Draw process 352 then calculates ordinate values (e.g. color values, Z, alpha, depth of field, etc.) for each of these samples and stores the data into sample buffer 162. In one embodiment, sample buffer 162 may only single-buffer Z values (and perhaps alpha values) while double-buffering other sample ordinates such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of the 2-D viewport may have a smaller bin capacity than bins corresponding to the center of the 2-D viewport. Since viewers are likely to focus their attention mostly on the center of the screen SCR, more processing bandwidth may be dedicated to providing enhanced image quality in the center of 2-D viewport. Note that the size and shape of bins may also vary from region to region, or from frame to frame. The use of bins will be described in greater detail below in connection with FIG. 11.

In parallel with draw process 352, filter process 360 is configured to: (a) read sample positions from sample position memory 354, (b) read corresponding sample values from sample buffer 162, (c) filter the sample values, and (d) output the resulting output pixel values onto video channels A and/or B. Sample-to-pixel calculation units 170 implement filter process 360. Filter process 360 is operable to generate the red, green, and blue values for an output pixel based on a spatial filtering of the corresponding data for a selected plurality of samples, e.g. samples falling in a neighborhood of the pixel center. Other values such as alpha may also be generated. In one embodiment, filter process 360 is configured to: (i) determine the distance of each sample from the pixel center; (ii) multiply each sample's ordinate values (e.g., red, green, blue, alpha) by a filter weight that is a specific (programmable) function of the sample's distance; (iii) generate sums of the weighted ordinates values, one sum per ordinate (e.g. a sum for red, a sum for green, ...), and (iv) normalize the sums to generate the corresponding pixel ordinate values. Filter process 360 is described in greater detail below (see description accompanying FIGS. 11, 12A, and 15).

In the embodiment just described, the filter kernel is a function of distance from the pixel center. However, in alternative embodiments, the filter kernel may be a more general function of X and Y displacements from the pixel center. Also, the support of the filter, i.e. the 2-D neighborhood over which the filter kernel takes non-zero values, may not be a circular disk. Any sample falling within the support of the filter kernel may affect the output pixel value being computed.

Figure 7:
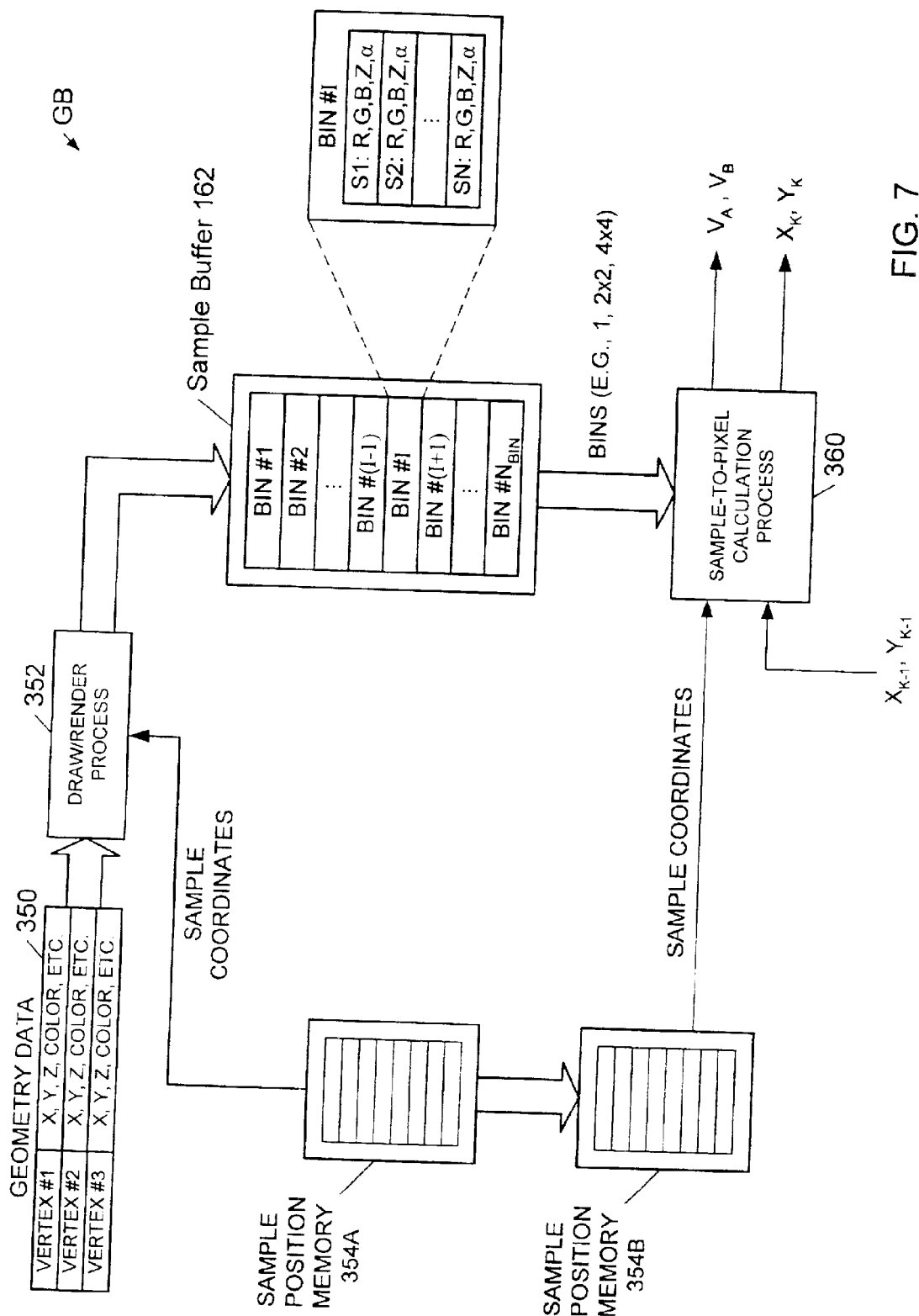
FIG. 7 illustrates another embodiment for the flow of data through graphics board GB.

FIG. 7 illustrates an alternate embodiment of graphics board GB. In this embodiment, two or more sample position memories 354A and 354B are utilized. Sample position memories 354A–B may be used to implement double buffering of sample position data. If the sample positions remain the same from frame to frame, the sample positions may be single-buffered. However, if the sample positions vary from frame to frame, then graphics board GB may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by sample position memory 354A while the other side of memory 354B is accessed by filter process 360. In this configuration, graphics board GB may change sample-positioning schemes on a per-frame basis by shifting the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw process 352 to the filter process 360.

Yet another alternative embodiment may store tags to offsets with the sample values in super-sampled sample buffer 162. These tags may be used to look-up the offset (i.e. perturbations) dX and dY associated with each particular sample.

Figure 8:
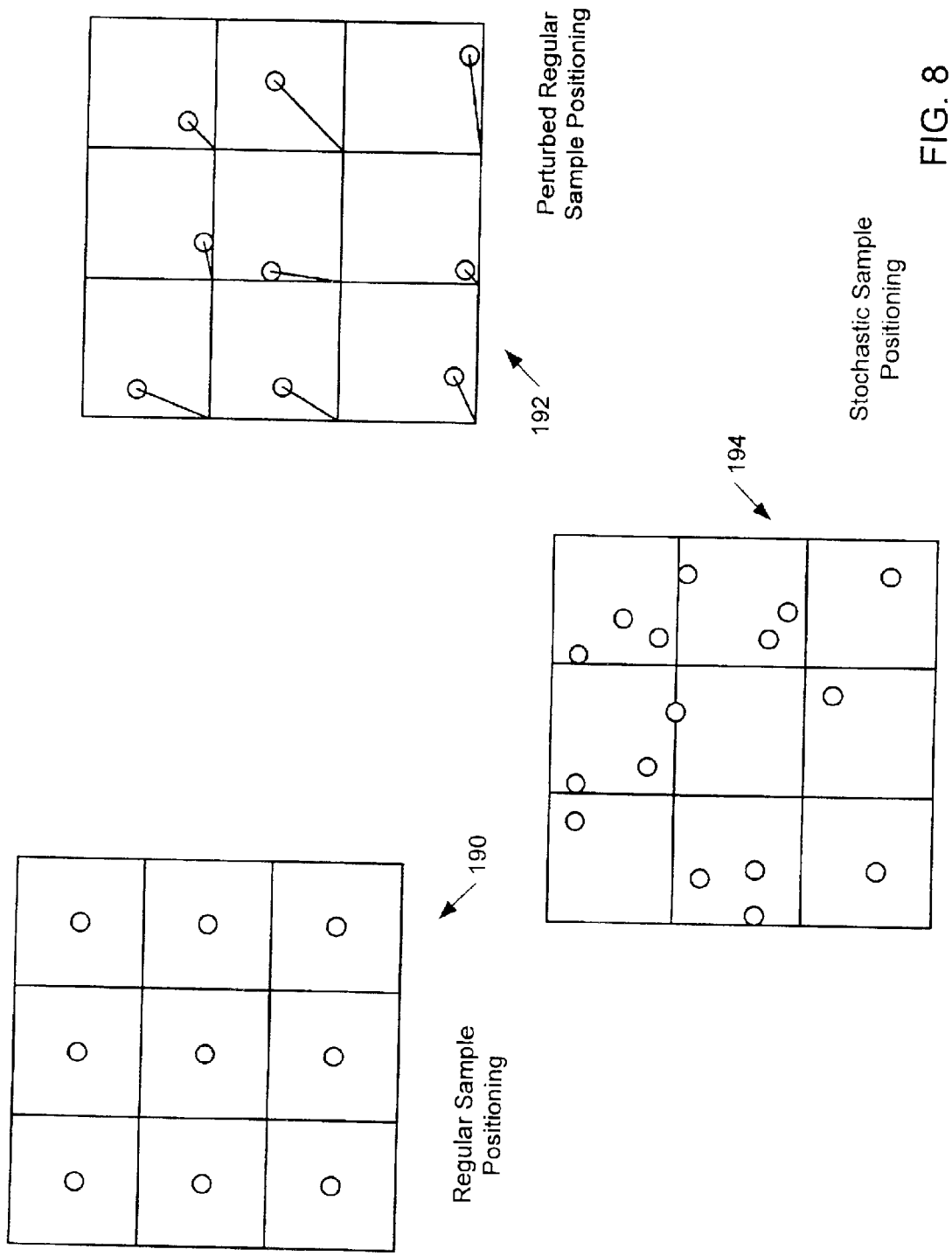
FIG. 8 illustrates three different sample positioning schemes.
Figure 9:
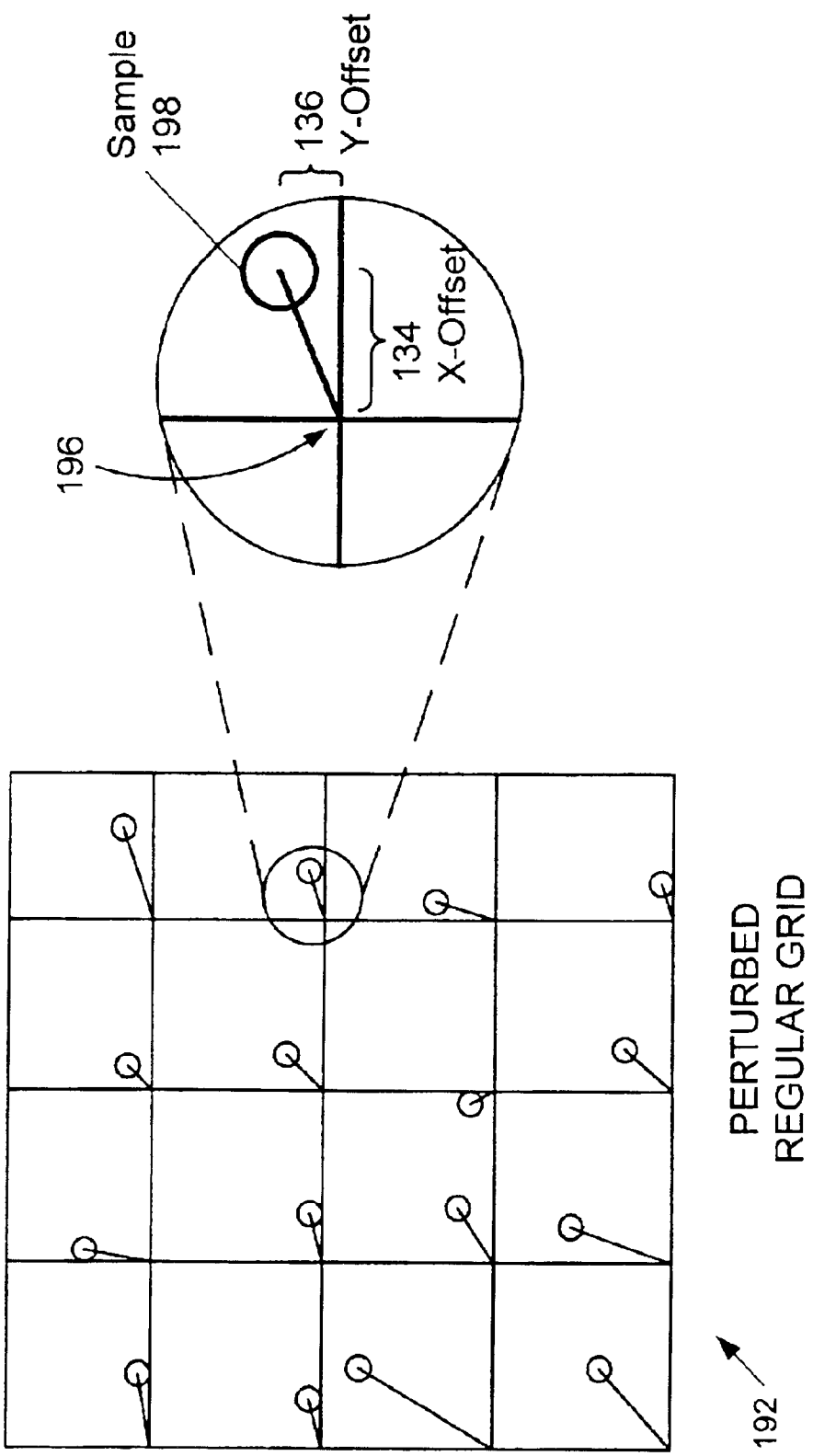
FIG. 9 illustrates one embodiment of a "perturbed regular" sample positioning scheme.
Figure 10:
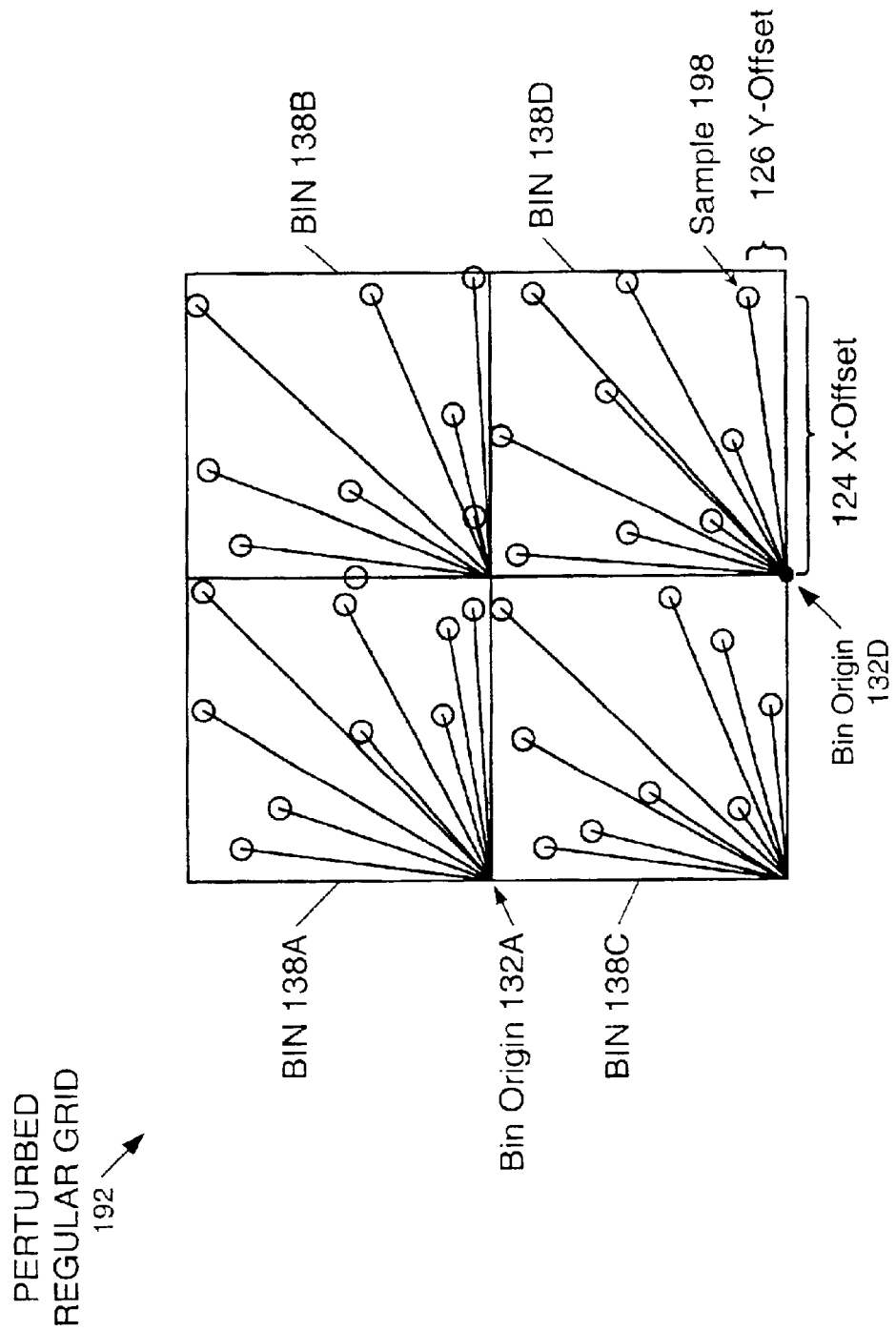
FIG. 10 illustrates another embodiment of the perturbed regular sample positioning scheme.

FIGS. 8–10: Sample Positioning Schemes

FIG. 8 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular grid scheme 192 may be based on any type of regular grid or tiling. Samples generated by perturbation with respect to a grid or hexagonal tiling may be particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Turning now to FIG. 9, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $X_{max}$, where $X_{max}$ is the width of a grid rectangle. Similarly, the y-offset may be limited to the range from zero to $Y_{max}$, where $Y_{max}$ is the height of a grid rectangle. The random offset may also be specified by an angle and radius with respect to the grid intersection point 196.

FIG. 10 illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x-offset and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

Figure 11:
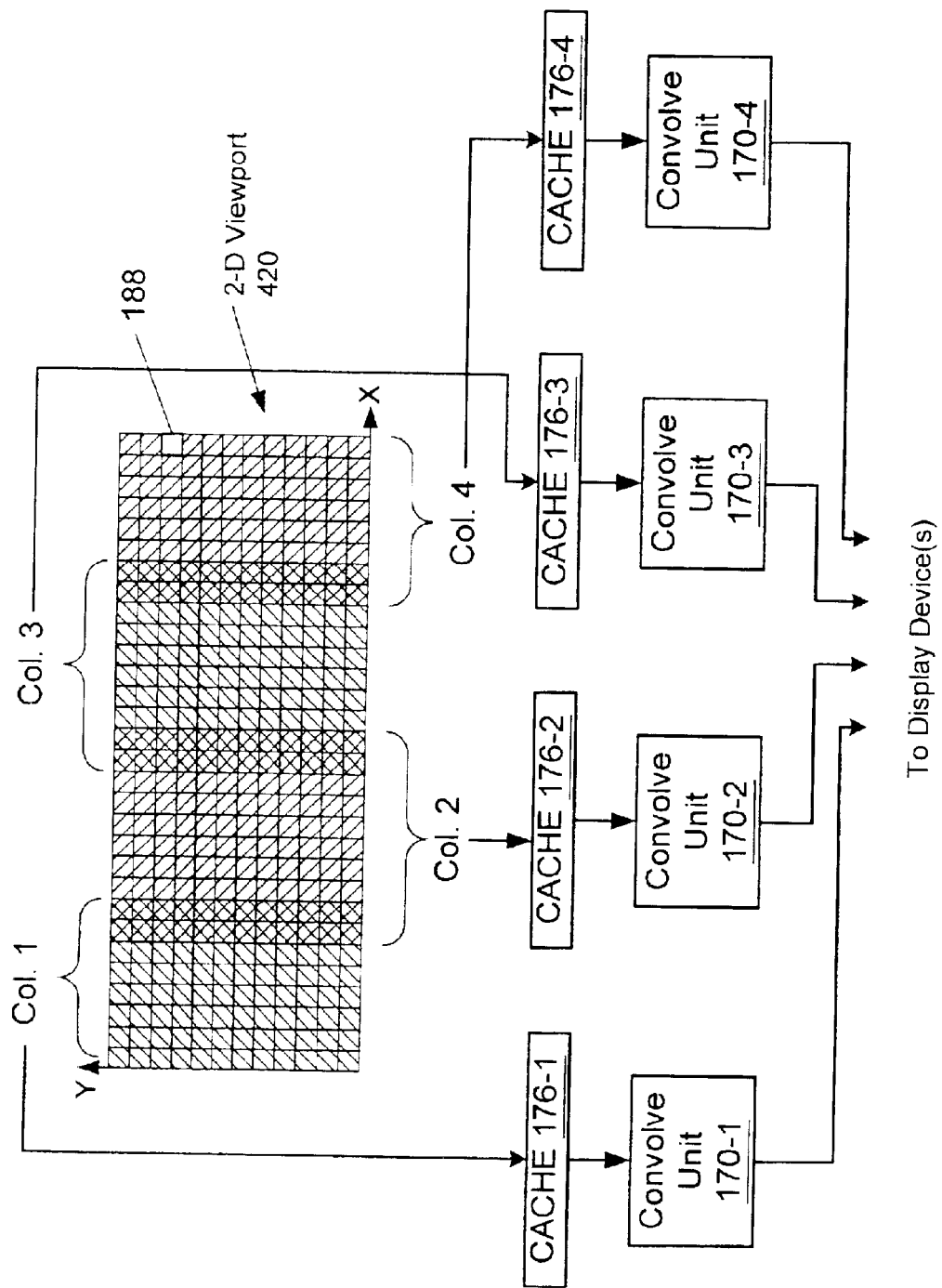
FIG. 11 illustrates one embodiment of a method for the parallel computation of pixel values from samples values.

FIG. 11—Computing Pixels from Samples

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample ordinate values (e.g. red, green, blue, Z, alpha, etc.) for the samples that reside in the corresponding spatial bin. Sample-to-pixel calculation units 170 (also referred to as convolve units 170) are configured to read memory bins from sample buffer 162 and to convert sample values contained within the memory bins into pixel values.

FIG. 11 illustrates one embodiment of a method for rapidly converting sample values stored in sample buffer 162 into pixel values. The spatial bins which cover the 2-D viewport may be organized into columns (e.g., Cols. 1–4). Each column comprises a two-dimensional subarray of spatial bins. The columns may be configured to horizontally overlap (e.g., by one or more spatial bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

FIG. 11 shows four sample-to-pixel calculation units 170 for the sake of discussion. It is noted that graphics board GB may include any number of the sample-to-pixel calculation units 170.

The amount of the overlap between columns may depend upon the horizontal diameter of the filter support for the filter kernel being used. The example shown in FIG. 11 illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns may prevent visual bands or other artifacts from appearing at the column boundaries for any operators larger than a pixel in extent.

Furthermore, the embodiment of FIG. 11 may include a plurality of bin caches 176 which couple to sample buffer 162. In addition, each of bin caches 176 couples to a corresponding one of sample-to-pixel calculation units 170. Bin cache 176-I (where I takes any value from one to four) stores a collection of memory bins from Column I, and serves as a cache for sample-to-pixel calculation unit 170-I. Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 12A:
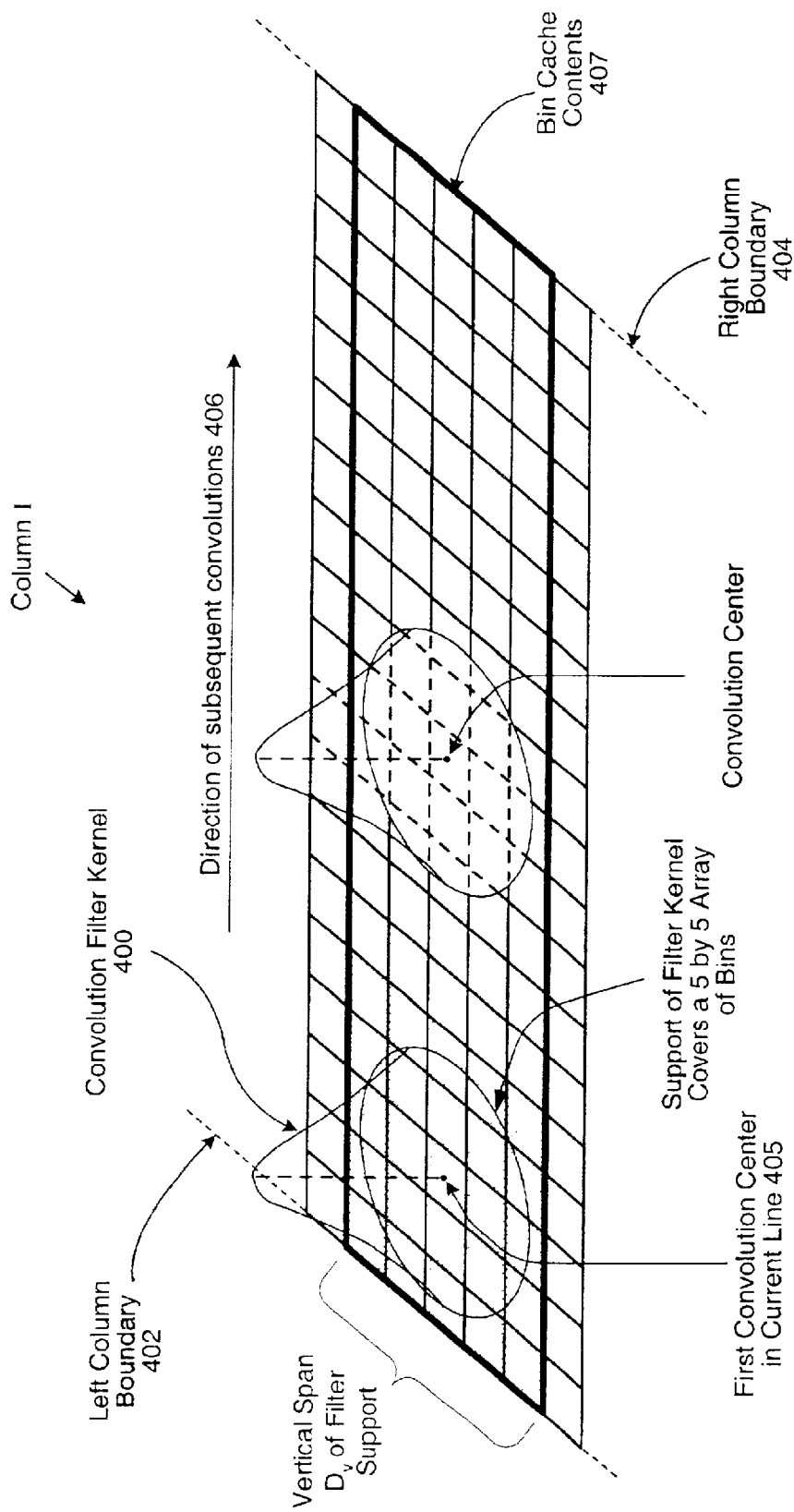
FIG. 12A illustrates one embodiment for the traversal of a filter kernel 400 across a generic Column I of FIG. 11.
Figure 12B:
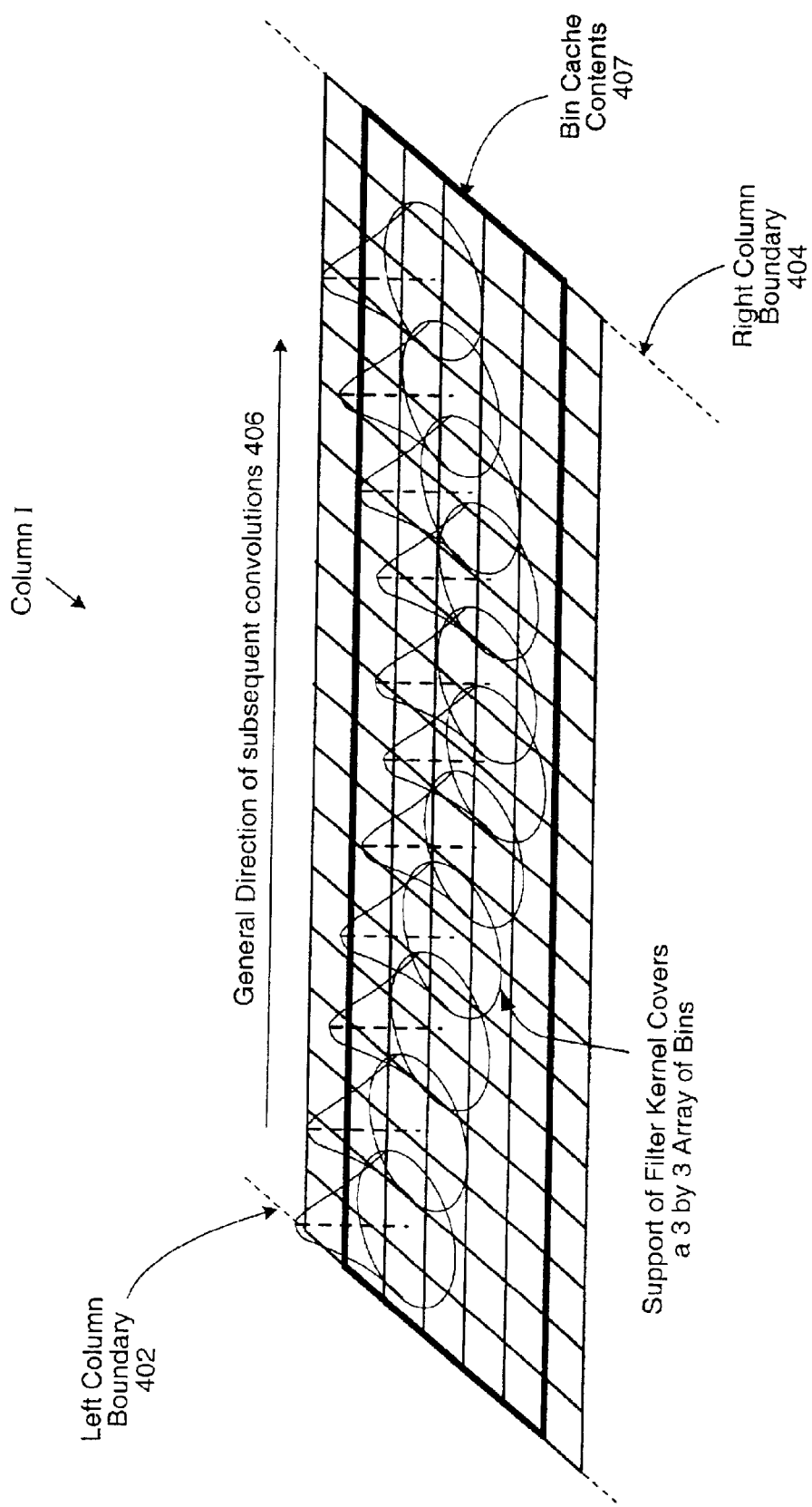
FIG. 12B illustrates one embodiment of a distorted traversal of filter kernel 400 across a generic Column I of FIG. 11.

FIG. 12A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit 170-I may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $D_L$ bin rows of memory bins. The cache line-depth parameter $D_L$ may be chosen to accommodate the support of filter kernel 400. If the support of filter kernel 400 is expected to span no more than $D_V$ bins vertically (i.e. in the Y direction), the cache line-depth parameter $D_L$ may be set equal to $D_V$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $D_L$ is set equal to $D_v+1$. In the example of FIG. 12A, the filter support covers $D_v=5$ bins vertically. Thus, the cache line-depth parameter $D_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $D_L$ were set at the theoretical minimum value $D_v$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit 170-I may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $D_L$ may be set to accommodate the maximum expected vertical deviation of the convolution centers. For example, in FIG. 12B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $D_L$ of at least five (i.e. two plus three).

As mentioned above, Columns 1 through 4 of the 2-D viewport may be configured to overlap horizontally. The size of the overlap between adjacent Columns may be configured to accommodate the maximum expected horizontal deviation of convolution centers from nominal convolution centers on a rectangular grid.

Figure 13A:
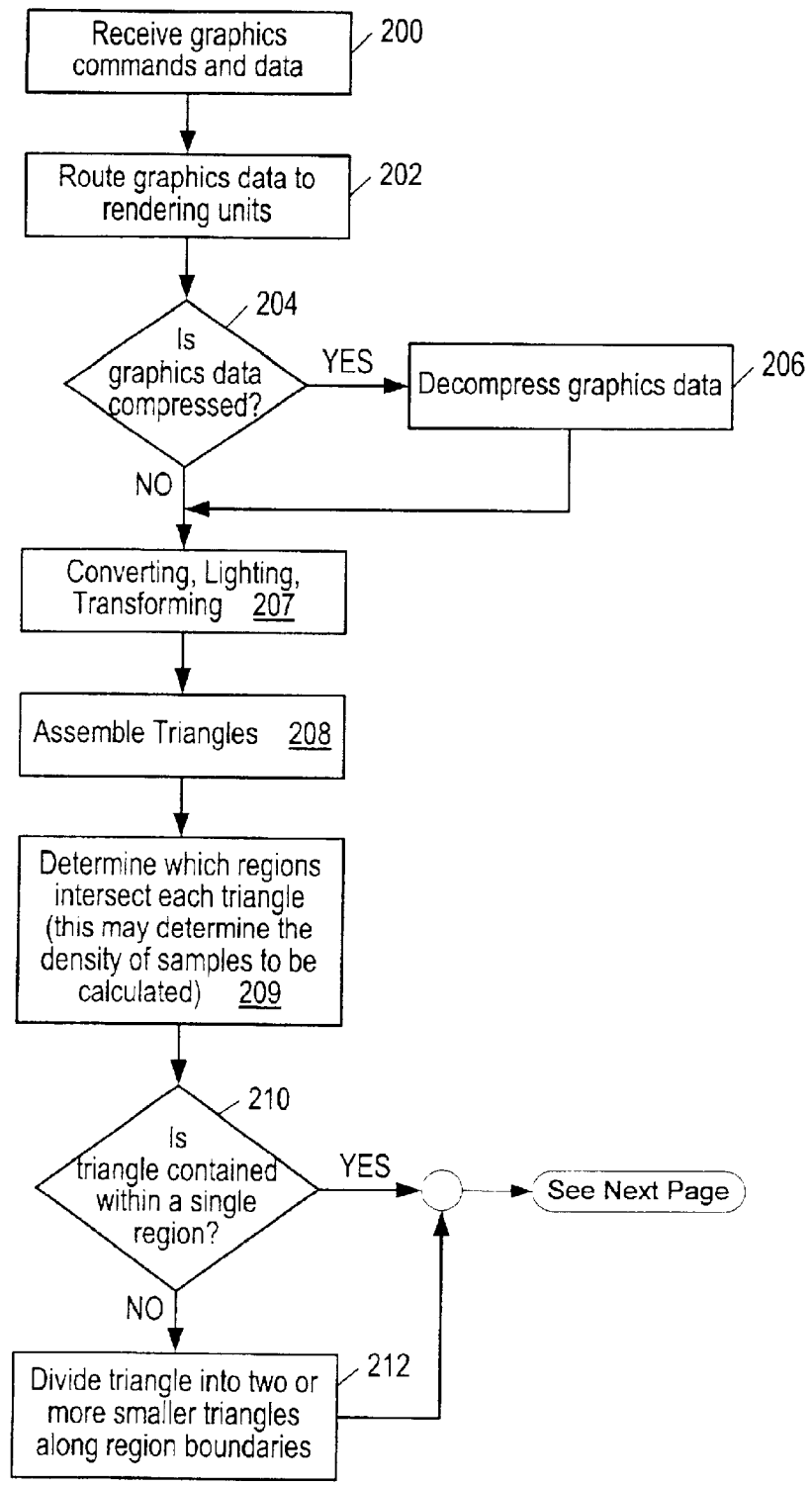
FIGS. 13A and 13B illustrate one embodiment of a method for drawing samples into a super-sampled sample buffer.
Figure 13B:
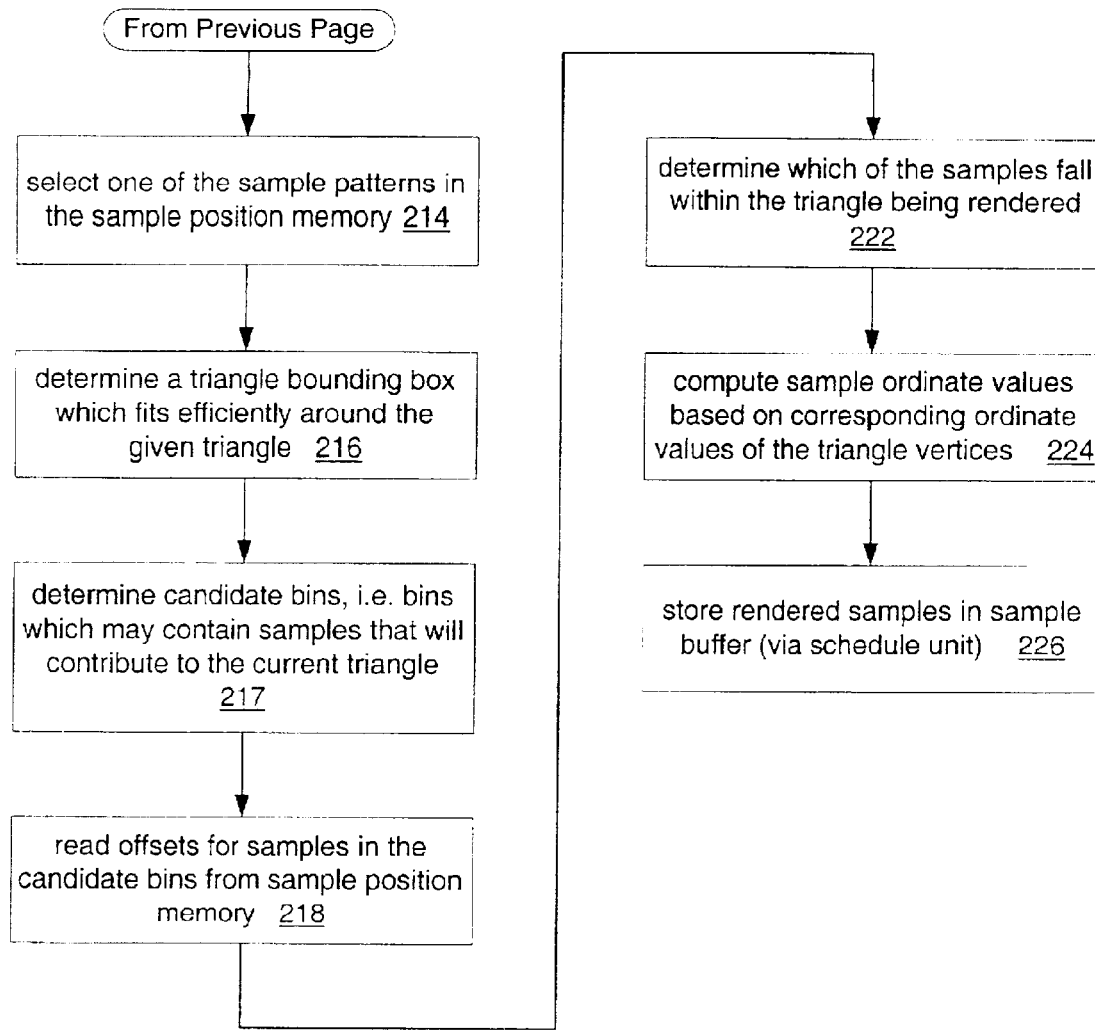
Figure 13C:
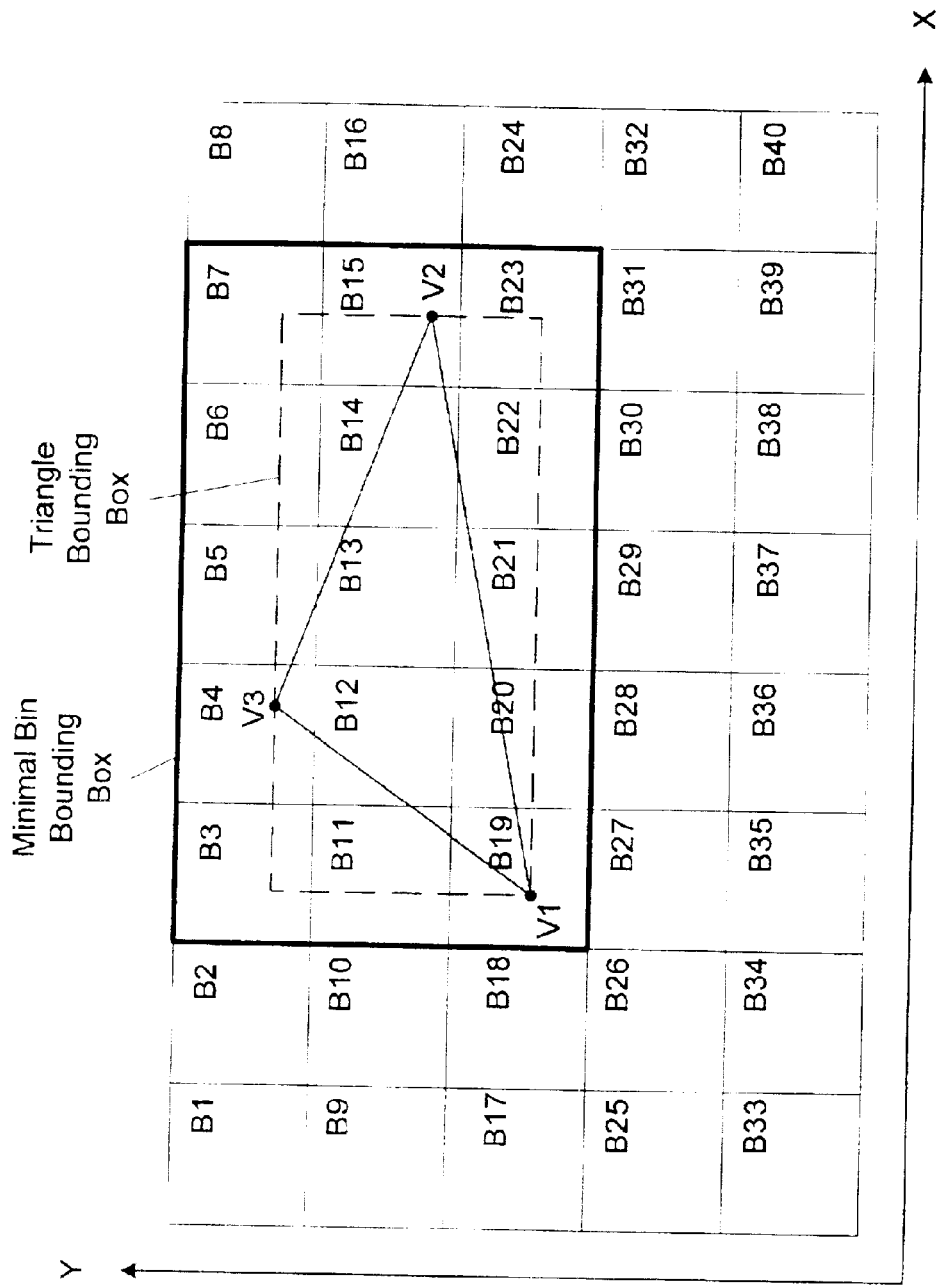
FIG. 13C illustrates a triangle and an array of bins superimposed on a portion of a virtual screen space with a triangle bounding box minimally containing the triangle and a bin bounding box enclosing the triangle bounding box.

FIGS. 13A&B—Rendering Samples into a Super-sampled Sample Buffer

FIGS. 13A&B illustrate one embodiment of a method for drawing or rendering samples into a super-sampled sample buffer. Certain of the steps of FIGS. 13A&B may occur concurrently or in different orders. In step 200, control unit 140 may receive graphics commands and graphics data from the host CPU 102 and/or directly from system memory 106. In step 202, control unit 140 may route the instructions and data to one or more of rendering units 150A–D. In step 204, a rendering unit, say rendering unit 150A for the sake of discussion, may determine if the graphics data is compressed. If the graphics data is compressed, rendering unit 150A may decompress the graphics data into a useable format, e.g., into a stream of vertex data structures, as indicated in step 206. Each vertex data structure may include x, y, and z coordinate values defining a point in a three dimensional space, and color values. A vertex data structure may also include an alpha value, normal vector coordinates $N_x$, $N_y$ and $N_z$, texture map values, etc.

In step 207, rendering unit 150A may process the vertices and convert the vertices into an appropriate space for lighting and clipping prior to the perspective divide and transform to virtual screen space. In step 208, rendering unit 150A may assemble the stream of vertex data structures into triangles.

If the graphics board GB implements variable resolution super-sampling, rendering unit 150A may compare the triangles with a set of sample-density region boundaries (as indicated in step 209). In variable-resolution super-sampling, different regions of the 2-D viewport may be allocated different sample densities based upon a number of factors (e.g., the center of the attention of an observer on projection screen SCR as determined by eye or head tracking). If the triangle crosses a sample-density region boundary (step 210), then the triangle may be divided into two smaller polygons (e.g. triangles) along the region boundary (step 212). The polygons may be further subdivided into triangles if necessary (since the generic slicing of a triangle gives a triangle and a quadrilateral). Thus, each newly formed triangle may be assigned a single sample density. In one embodiment, rendering unit 150A may be configured to render the original triangle twice, i.e. once with each sample density, and then, to clip the two versions to fit into the two respective sample density regions.

In step 214, rendering unit 150A selects one of the sample positioning schemes (e.g., regular, perturbed regular, stochastic, etc.) from sample position memory 354. In one embodiment, the sample positioning scheme may be pre-programmed into the sample position memory 354. In another embodiment, the sample-positioning scheme may be selected "on the fly".

Figure 13D:
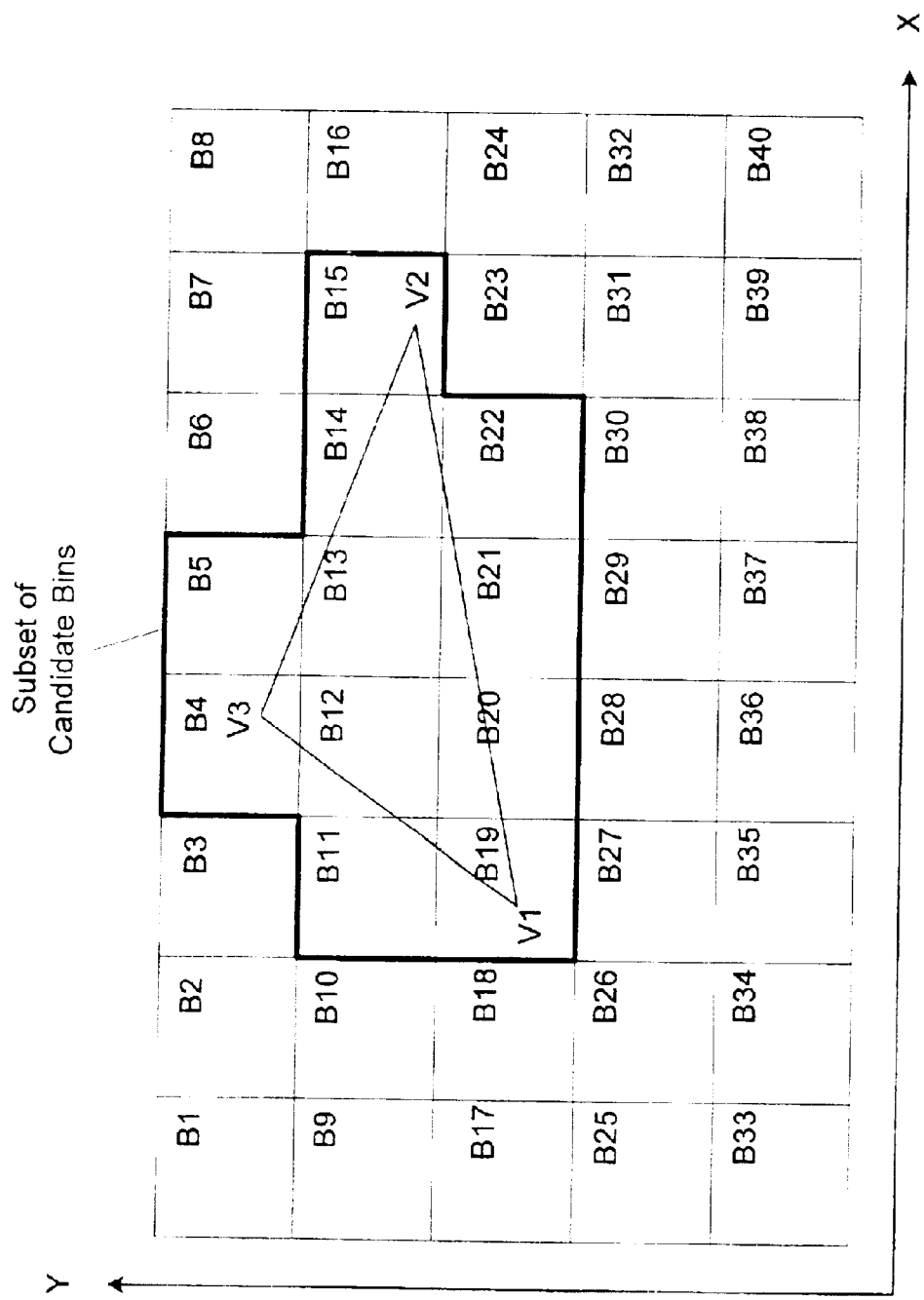
FIG. 13D illustrates an efficient subset of candidate bins containing a triangle in virtual screen space.

In step 217, rendering unit 150A may determine a subset of spatial bins which, based on their positional relation to the given triangle, may contribute samples that fall within the given triangle. The bins in this subset are referred to herein as candidate bins. In one embodiment, rendering unit 150A may determine the candidate bins by computing a minimal bin bounding box, i.e. a minimal rectangle of bins which efficiently contains the triangle bounding box, as suggested in FIG. 13C. For example, rendering unit 150A may first compute coordinates for a triangle bounding box by determining the maximum and minimum of the x and y coordinates of the triangle vertices. By rounding up and down the triangle bounding box coordinates, rendering unit 150 may determine coordinates for the minimal bin bounding box. In another embodiment, rendering unit 150A may use triangle vertex data to determine a more efficient (i.e. smaller) subset of candidate bins as shown in FIG. 13D. Rendering unit 150A may eliminate bins in the minimal bin bounding box which have no intersection with the triangle.

In step 218, rendering unit 150A may compute a set of sample positions for each of the candidate bins by reading positional offsets dX and dY from sample position memory 354 and adding the positional offsets to the coordinates of the corresponding bin origin (e.g. the lower-left corner of the bin). For various embodiments of the sample position computation, refer to the textual description above corresponding to FIGS. 8–10.

Figure 13E:
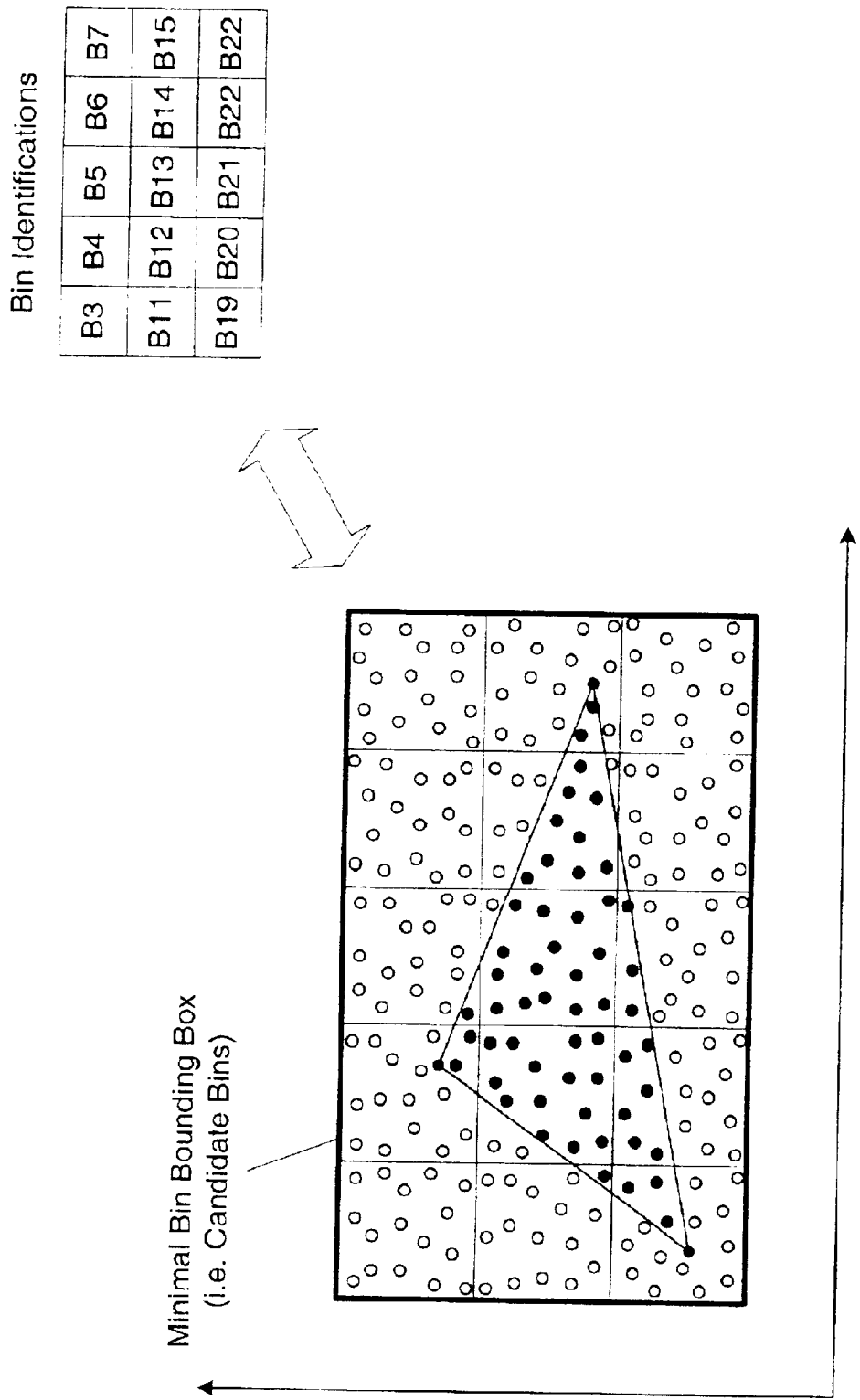
FIG. 13E illustrates a filtration of the sample positions to determine those sample positions which fall inside the triangle.

In step 222, rendering unit 150A may filter the sample-positions in the candidate bins with respect to the given triangle as suggested in FIG. 13E. In other words, rendering unit 150A may operate on the sample positions to determine those sample positions which reside inside the triangle. In one embodiment, rendering unit 150A may use the triangle vertices to compute parameters for linear edge equations corresponding to the three edges of the triangle. For each of the sample positions, rendering unit 150A may compute a vertical or horizontal displacement of the sample with respect to each of the three edges of the triangle. Rendering unit 150A may examine the signs of the three edge-relative displacements to determine whether the sample position is inside or outside the triangle.

For each sample position that is determined to be within the triangle, rendering unit 150A may interpolate sample ordinate values (e.g. color values, alpha, Z, texture values, etc.) based on the known ordinate values at the vertices of the triangle as indicated in step 224. In step 226, render unit 150A may forward the rendered sample ordinate values to schedule unit 154, which then stores the samples in sample buffer 162.

The embodiment of the rendering method described above is not meant to be limiting. For example, in some embodiments, two or more of the steps shown in FIGS. 13A–B as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Figure 14:
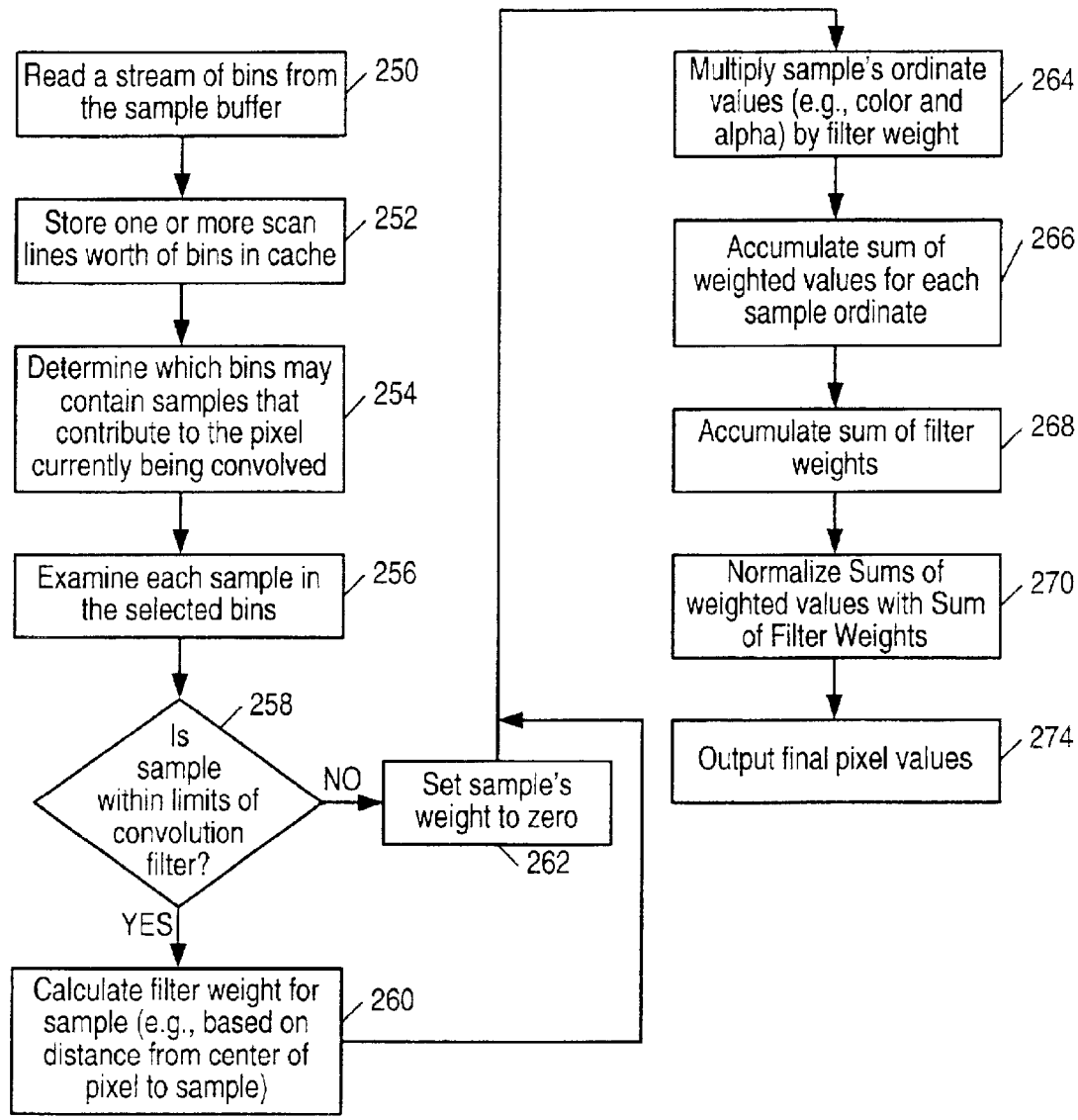
FIG. 14 illustrates one embodiment of a method for calculating pixel values from sample values.

FIG. 14—Generating Output Pixels Values from Sample Values

FIG. 14 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow the sample-to-pixel calculation units 170 easy access to samples (i.e. sample positions and their corresponding ordinate values) during the convolution operation. In step 254, the memory bins are examined to determine which of the memory bins may contain samples that contribute to the output pixel value currently being generated. The support (i.e. footprint) of the filter kernel 400 (see FIG. 12A) intersects a collection of spatial bins. The memory bins corresponding to these samples may contain sample values that contribute to the current output pixel.

Each sample in the selected bins (i.e. bins that have been identified in step 254) is then individually examined to determine if the sample does indeed contribute samples to the support of filter kernel 400 (as indicated in steps 256–258). This determination may be based upon the distance from the sample to the center of the output pixel being generated.

In one embodiment, the sample-to-pixel calculation units 170 may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. In one embodiment, this squared-distance indexing scheme may be facilitated by using a floating point format for the distance (e.g., four or five bits of mantissa and three bits of exponent), thereby allowing much of the accuracy to be maintained while compensating for the increased range in values. The table of filter weights may be stored in ROM and/or RAM. Filter tables implemented in RAM may, in some embodiments, allow the graphics system to vary the filter coefficients on a per-frame or per-session basis. For example, the filter coefficients may be varied to compensate for known shortcomings of a display and/or projection device or for the user's personal preferences. The graphics system can also vary the filter coefficients on a screen area basis within a frame, or on a per-output pixel basis. In another alternative embodiment, graphics board GB may include specialized hardware (e.g., multipliers and adders) to calculate the desired filter weights for each sample. The filter weight for samples outside the limits of the convolution filter may simply be multiplied by a filter weight of zero (step 262), or they may be removed from the convolution-sum calculation entirely.

In one alternative embodiment, the filter kernel may not be expressible as a function of distance with respect to the filter center. For example, a pyramidal tent filter is not expressible as a function of distance from the filter center. Thus, filter weights may be tabulated (or computed) in terms of X and Y sample-displacements with respect to the filter center.

Once the filter weight for a sample has been determined, the ordinate values (e.g. red, green, blue, alpha, etc.) for the sample may then be multiplied by the filter weight (as indicated in step 264). Each of the weighted ordinate values may then be added to a corresponding cumulative sum—one cumulative sum for each ordinate—as indicated in step 266. The filter weight itself may be added to a cumulative sum of filter weights (as indicated in step 268). After all samples residing in the support of the filter have been processed, the cumulative sums of the weighted ordinate values may be divided by the cumulative sum of filter weights (as indicated in step 270). It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, the normalized output pixels may be output for gamma correction, digital-to-analog conversion (if necessary), and eventual display (step 274).

Figure 15:
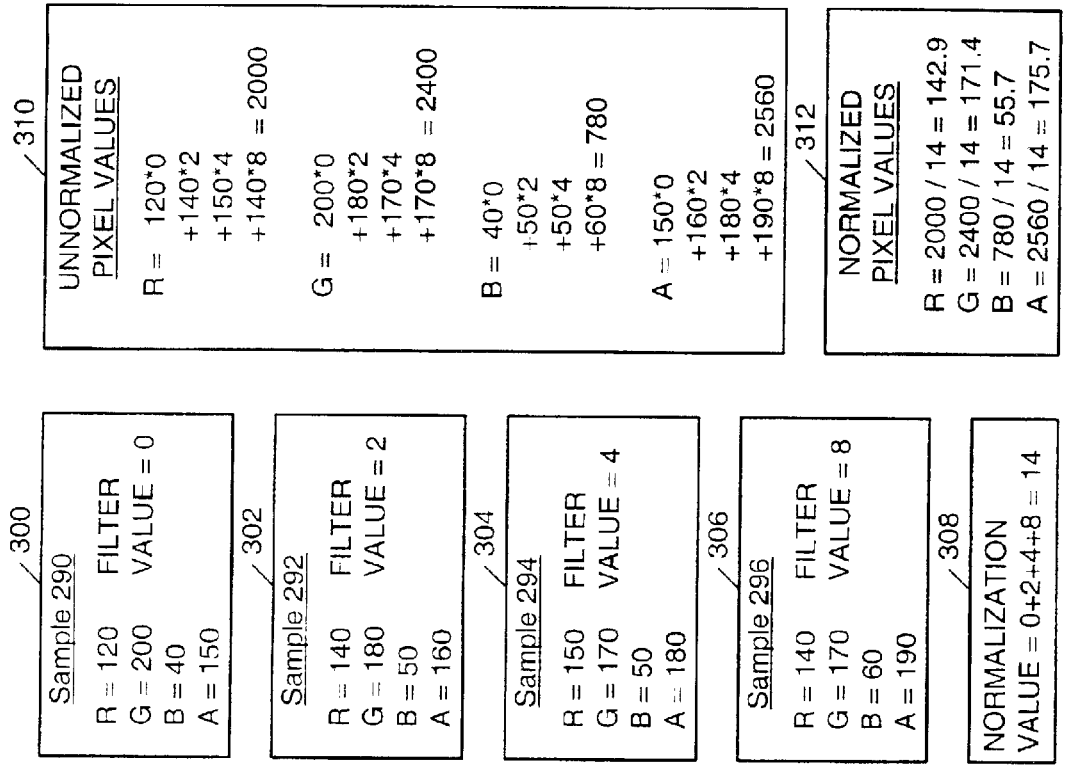
FIG. 15 illustrates details of one embodiment of a convolution for an example set of samples at a virtual pixel center in the 2-D viewport.
Figure 15:
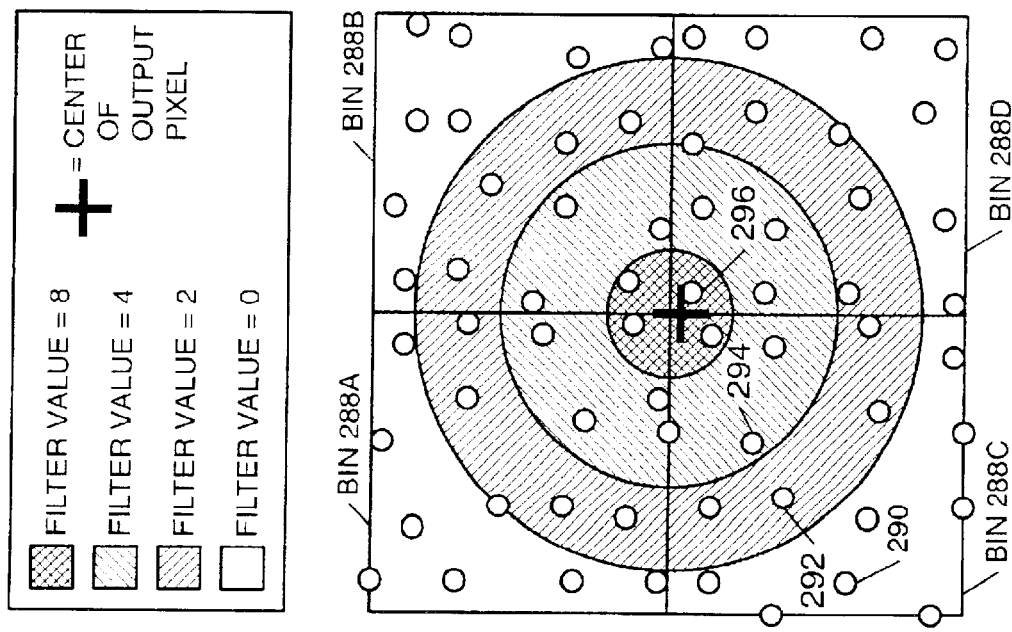

FIG. 15—Example Output Pixel Convolution

FIG. 15 illustrates a simplified example of an output pixel convolution with a filter kernel which is radially symmetric and piecewise constant. As the figure shows, four bins 288A–D contain samples that may possibly contribute to the output pixel convolution. In this example, the center of the output pixel is located at the shared corner of bins 288A–288D. Each bin comprises sixteen samples, and an array of four bins (2×2) is filtered to generate the ordinate values (e.g. red, green, blue, alpha, etc.) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed ordinate values for the output pixel. Because the filter kernel is a decreasing function of distance from the pixel center, samples close to the pixel center may contribute more to the computed ordinate values than samples farther from the pixel center. This type of filtering may be used to perform image smoothing or anti-aliasing.

Example ordinate values for samples 290–296 are illustrated in boxes 300–306. In this example, each sample comprises red, green, blue and alpha values, in addition to the sample's positional data. Block 310 illustrates the calculation of each pixel ordinate value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel ordinate values.

The filter presented in FIG. 15 has been chosen for descriptive purposes only and is not meant to be limiting. A wide variety of filters may be used for pixel value computations depending upon the desired filtering effect(s). It is a well known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Rom filter as a special case) are obtained by approximating some of the negative lobes and positive lobes which surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

The piecewise constant filter function shown in FIG. 15 with four constant regions is not meant to be limiting. For example, in one embodiment the convolution filter may have a large number of regions each with an assigned filter value (which may be positive, negative and/or zero). In another embodiment, the convolution filter may be a continuous function that is evaluated for each sample based on the sample's distance (or X and Y displacements) from the pixel center. Also note that floating point values may be used for increased precision.

Rendering Lines

Figure 16:
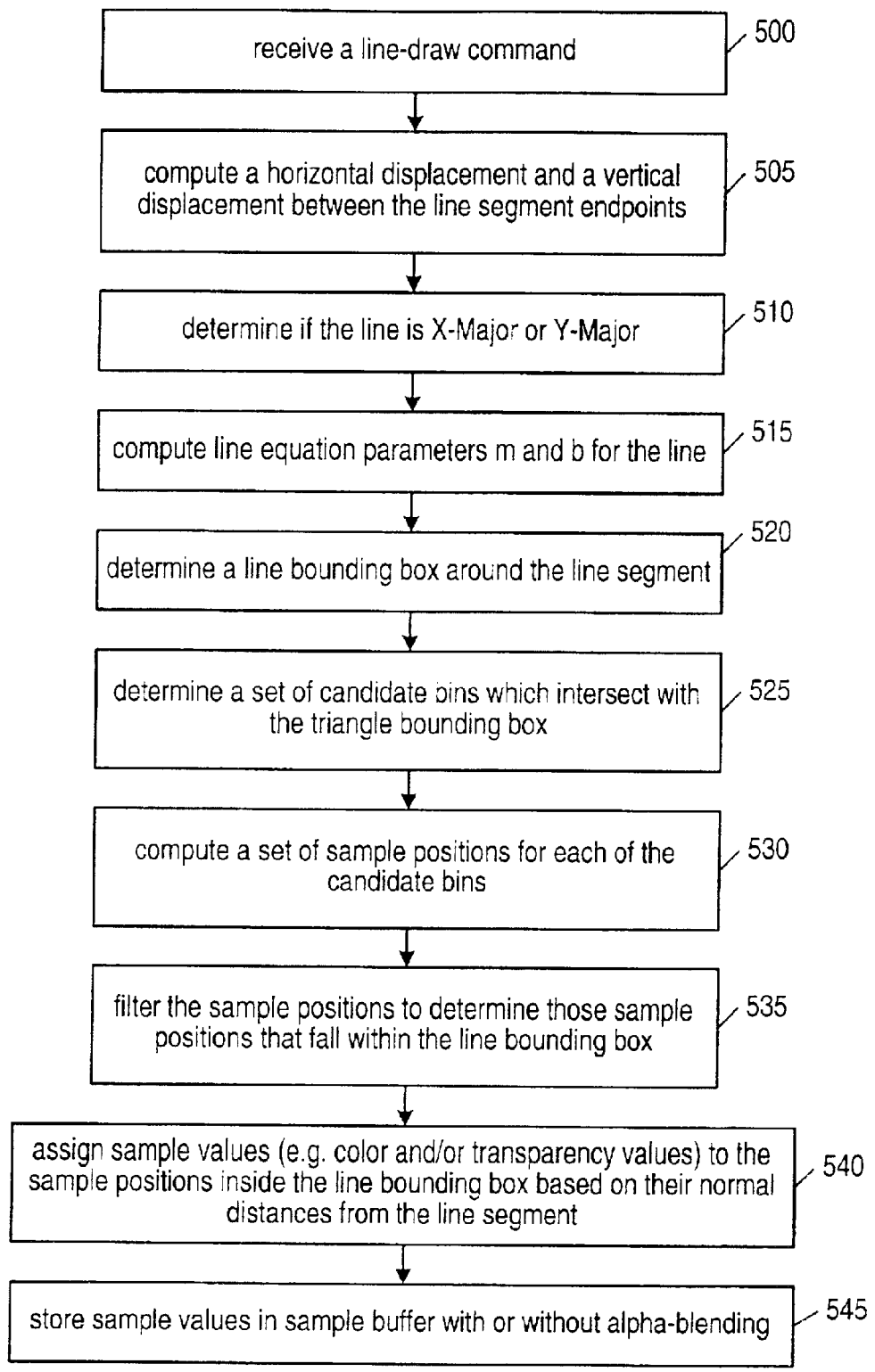
FIG. 16 illustrates one embodiment of a method for rendering lines in terms of samples into sample buffer 162.

The graphics instructions received by graphics system 112 may include line-draw commands. In some embodiments, a command for drawing a line may provide coordinates for two points $P_1=(X_1,Y_1,Z_1)$ and $P_2=(X_2,Y_2,Z_2)$ defining the line ends. The line-draw command may also comprise color information (e.g., R, G, B), as well as other attributes such as a line width value $D_L$, an alpha transparency value, texture coordinates, etc. FIG. 16 shows one embodiment of a method for rendering a line in response to a line-draw command.

In step 500, one of rendering units 150A–D, e.g. rendering unit 150A, may receive a line-draw command. The following discussion will refer to rendering unit 150A. However, it is to be understood that any or all of rendering units 150A–D may be configured to perform the processing operations associated with FIG. 16.

In step 505, rendering unit 150A may compute a horizontal displacement DeltaX and a vertical displacement DeltaY between the line segment endpoints $P_1$ and $P_2$:

$$DeltaX=X_2-X_1,$$

$$DeltaY=Y_2-Y_1.$$

In step 510, rendering unit 150A may compare the absolute value of DeltaX to the absolute value of DeltaY. If the absolute value of DeltaX is greater than or equal to the absolute value of DeltaY, the line segment is said to be X-Major. If the absolute value of DeltaX is smaller than the absolute value of DeltaY, the line segment is said to be Y-Major. Rendering unit 150A labels the line segment as X-Major or Y-Major depending on the result of the absolute value comparison.

In step 515, rendering unit 150A may compute parameters m and b for a line equation corresponding to the line segment from $P_1$ to $P_2$. If the line segment is X-Major, rendering unit 150A may compute parameters m and b for the line equation in the form y=mx+b, i.e. m=DeltaY*(1/DeltaX) and $b=Y_2-m*X_2$. If the line segment is Y-Major, rendering unit 150A may compute parameters m and b for the line equation in the form x=my+b, i.e. m=DeltaX*(1/DeltaY) and $b=X_2-m*Y_2$. By computing the slope and intercept for the line segment in this major-sensitive fashion, slopes are guaranteed to be between negative one and one, and thus, the number of bits allocated for storing slope m may be more efficiently utilized. It is noted that the reciprocal values (1/DeltaX) and (1/DeltaY) may be computed by lookup in a ROM table.

Figure 17A:
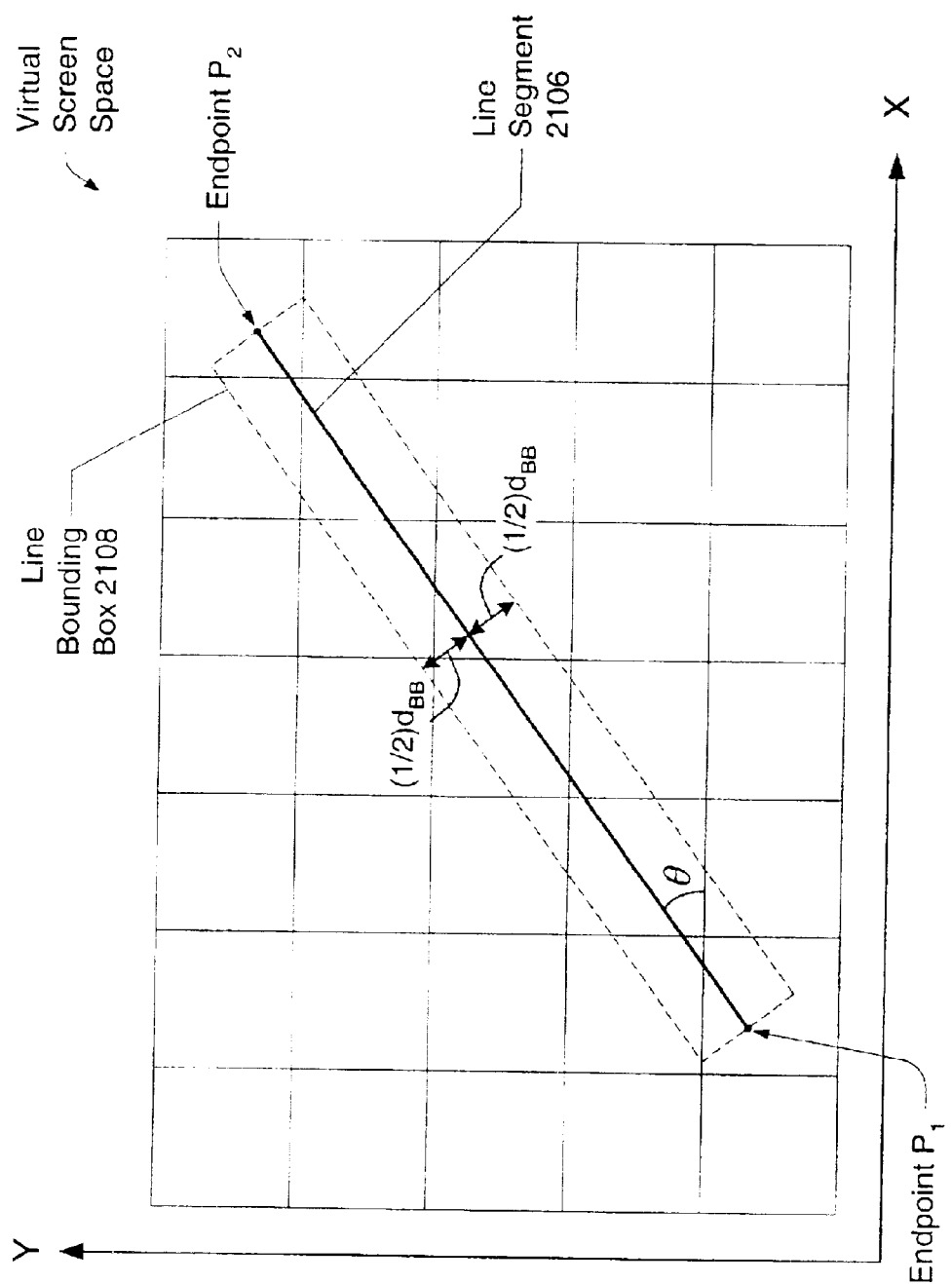
FIG. 17A illustrates a line segment 2106 and a line bounding box 2108 surrounding the line segment 2106 in the virtual screen space.

In step 520, rendering unit 150A may determine a line bounding box 2108 around the line segment 2106 as suggested by FIG. 17A. The line bounding box 2108 may have a width $d_{BB}$ in the direction normal to the line segment 2106. The bounding box width $d_{BB}$ may be computed based on the line width value $D_L$ supplied in the line-draw command. For example, in one embodiment, the bounding box width $d_{BB}$ may be a scalar multiple of the line width value $D_L$, i.e. $d_{BB}=k*D_L$.

Rendering unit 150A may compute a slope and intercept for each side of the line bounding box based on (a) the bounding box width $d_{BB}$, and (b) the slope m and intercept b of the line segment 2106. For an X-Major line segment, rendering unit 150A may determine the upper and lower box edges by the equations $$y=mx+(b+V)$$

and $$y=mx+(b-V)$$

respectively, where $V=(\frac{1}{2})d_{BB}*\mathrm{secant}(\theta)$, and where $\theta$ is the angle that the line segment forms with respect to the positive x axis. It is noted that the value $\mathrm{secant}(\theta)$ may be stored in a lookup table addressed by slope m.

Figure 17B:
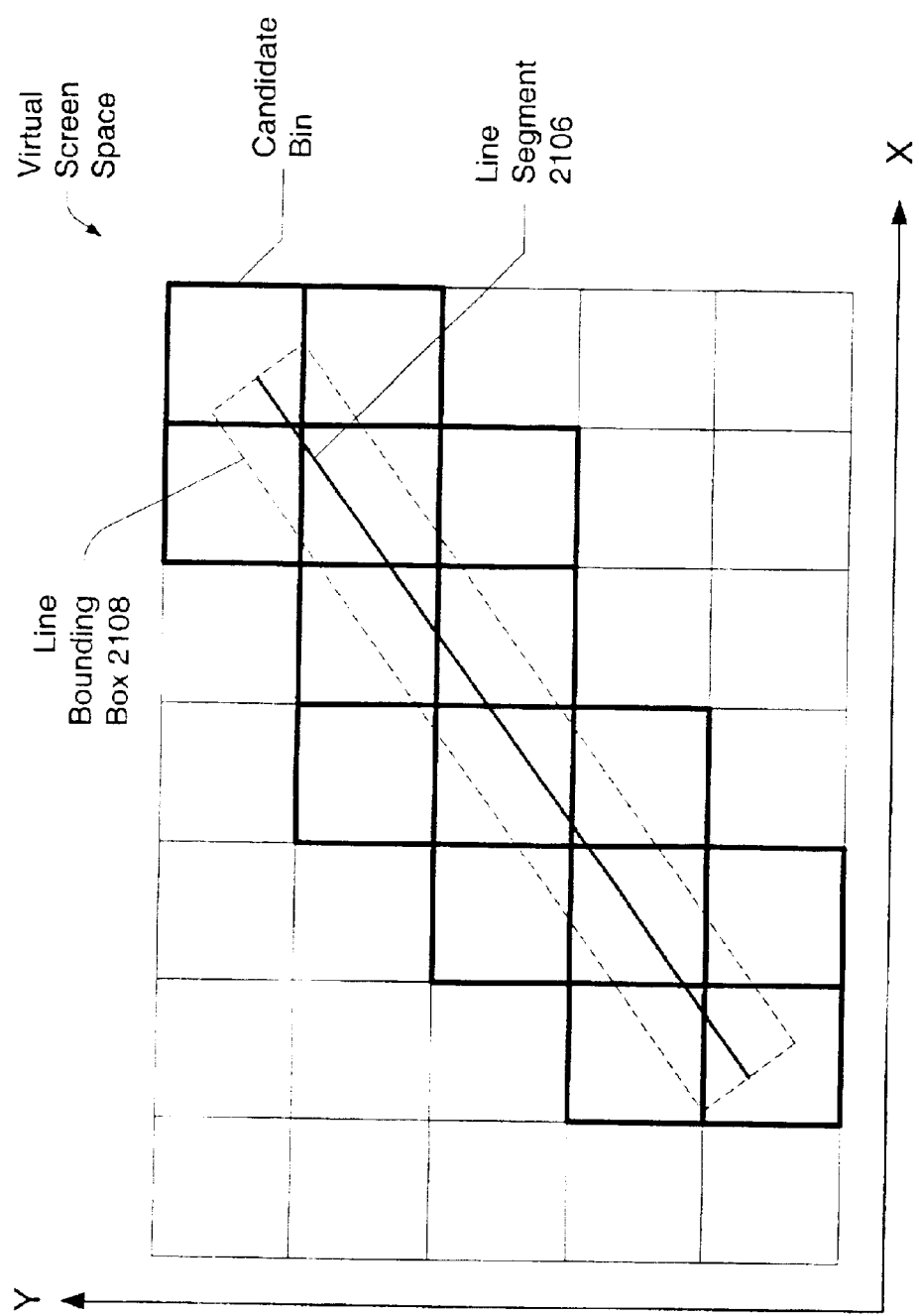
FIG. 17B illustrates one embodiment for the selection of candidate bins which interact with the line bounding box 2108 in virtual screen space.

In step 525, rendering unit 150A may determine a set of candidate bins in the virtual screen space which intersect with the triangle bounding box as suggested in FIG. 17B. The candidate bins are denoted with heavy outline.

Figure 17C:
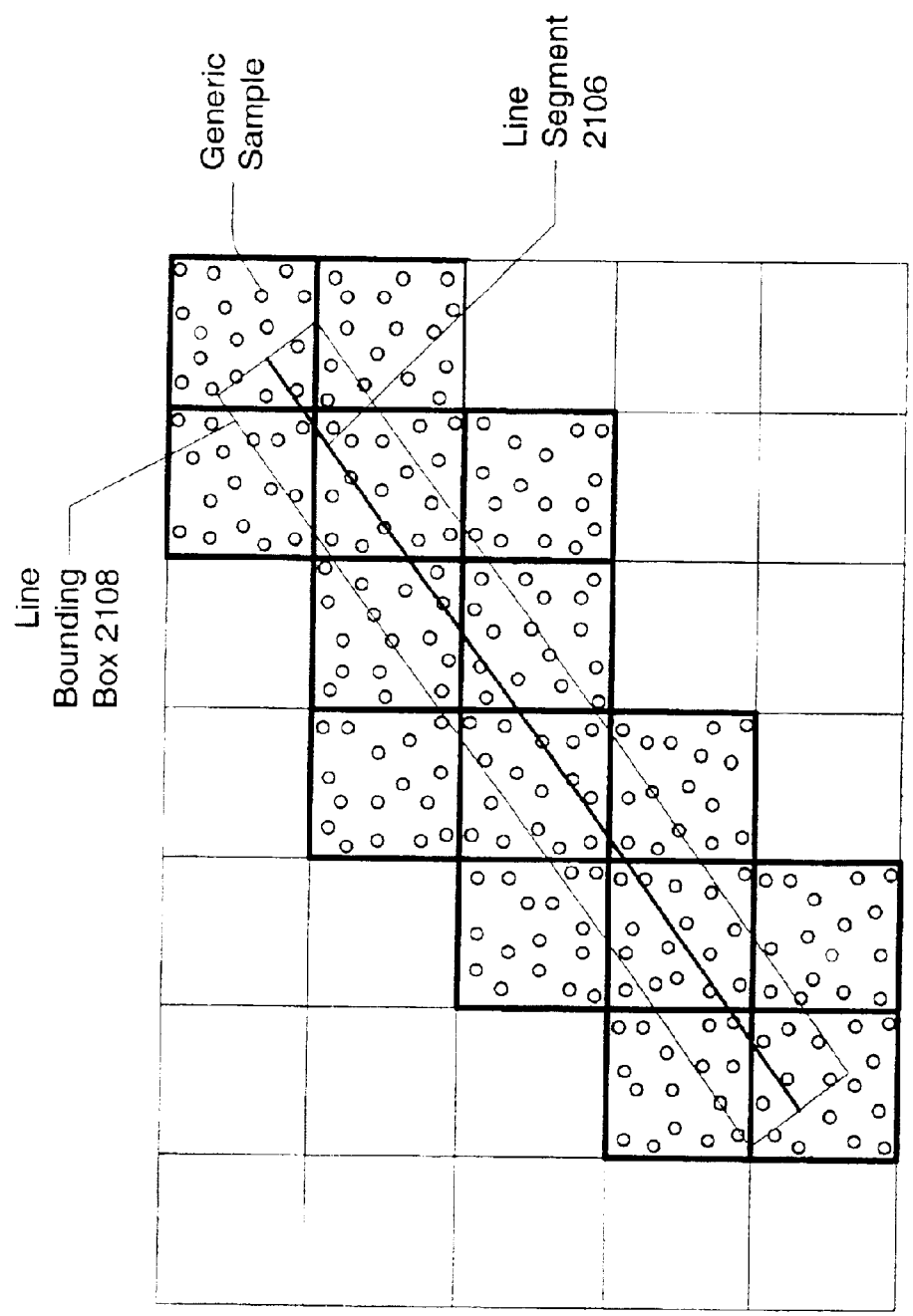
FIG. 17C illustrates one embodiment for populating the candidate bins with sample positions.

In step 530, rendering unit 150A may compute a set of sample positions for each of the candidate bins as suggested by FIG. 17C. For example, rendering unit 150A may read positional offsets dX and dY from sample position memory 354 and add the positional offsets to the coordinates of the corresponding bin origin (e.g. the lower-left corner of the bin). For various embodiments of the sample position computation, refer to the textual description above corresponding to FIGS. 8–10.

Figure 17D:
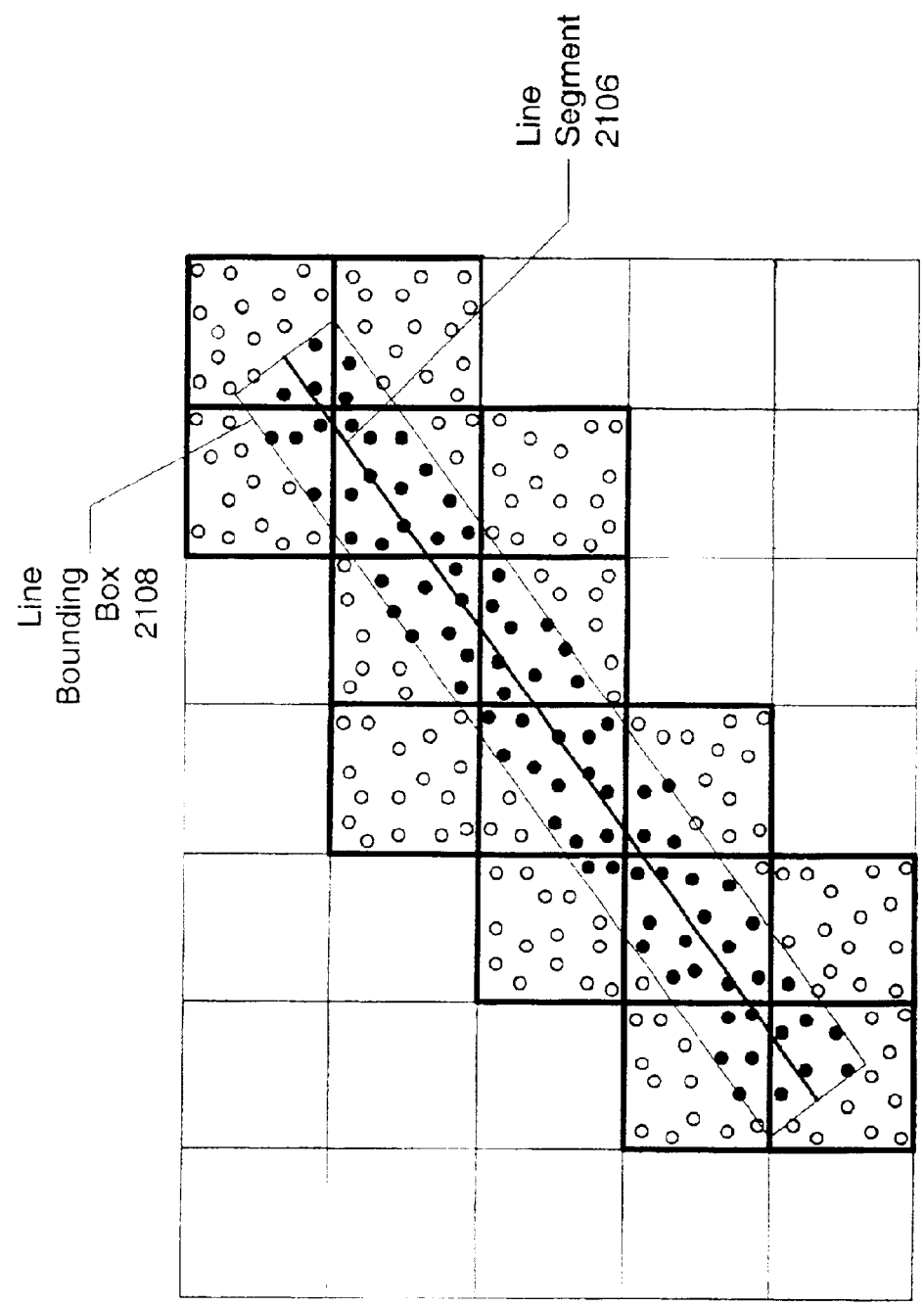
FIG. 17D illustrates a filtration of sample positions with respect to the line bounding box 2108.

In step 535, rendering unit 150A may filter the sample positions in the candidate bins to determine those sample positions that fall within the line bounding box 2108 as suggested by FIG. 17D. Samples interior to the line bounding box 2108 are illustrated as blackened dots, while samples outside the line bounding box are illustrated as unfilled dots.

In step 540, rendering unit 150A may assign color values (and/or transparency values) to the sample positions inside the line bounding box 2108 based on their normal distance from the line segment 2106. Rendering unit 150A may assign color values (and/or transparency values) to samples using a window function which varies in the direction normal to the line segment 2106.

Figure 17E:
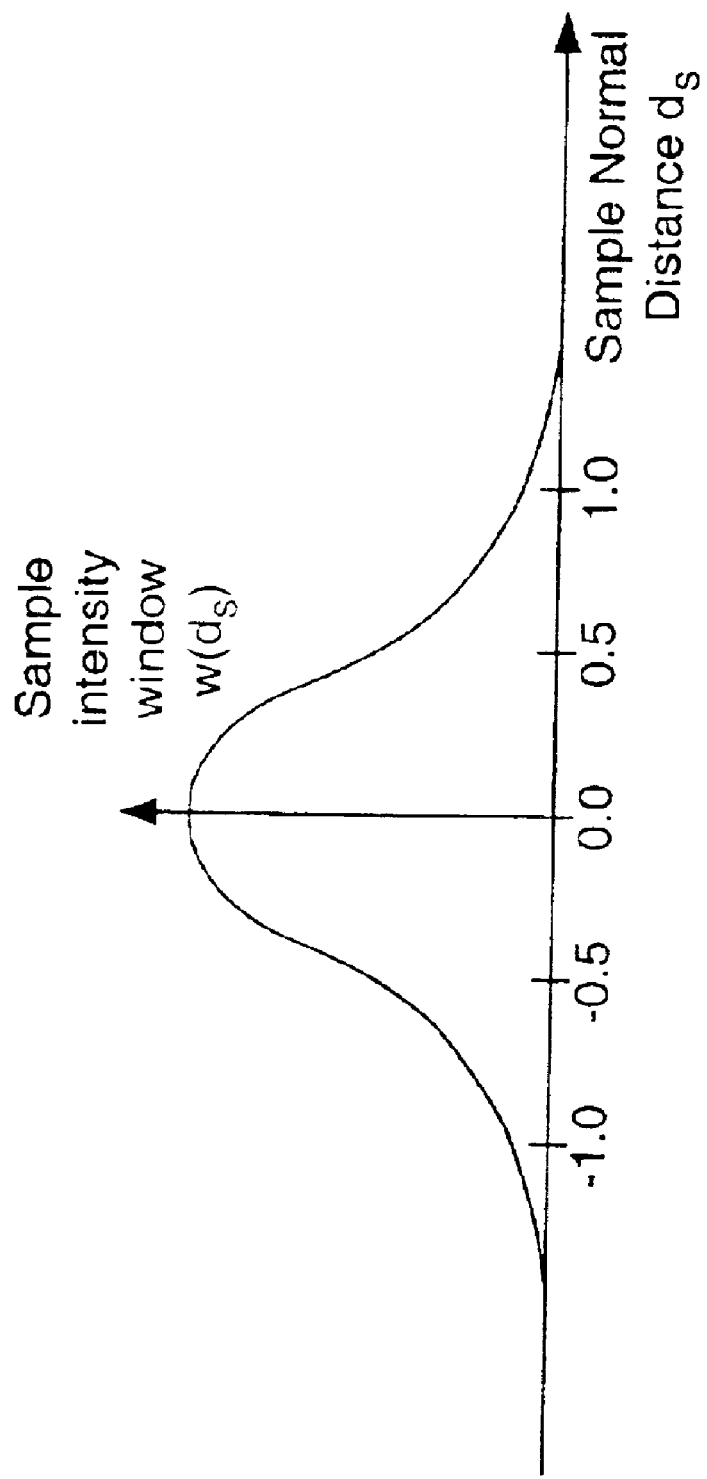
FIG. 17E illustrates one embodiment of a Gaussian window function which depends on sample normal distance.

For example, if the line color is blue and the background color is white, rendering unit 150A may implement a Gaussian transition of sample colors from blue on the line segment 2106 to white at some normal distance away from the line segment 2106. More generally, in one embodiment, rendering unit 150A may assign color vector (R,G,B)s to an interior sample (i.e. a sample interior to the line bounding box) according to the vector relation:

$$(R,G,B)_s=w(d_s)*(R,G,B)_L+(1-w(d_s))*(R,G,B)_{BG},$$

where $(R,G,B)_L$ denote the line color vector, $(R,G,B)_{BG}$ denotes the background color, $d_s$ denotes the normal distance of the sample from the line segment 2106, and $w(d_s)$ is the window function. The window function may have a maximum value of one on the line segment, i.e. for $d_s=0$, and may converge to zero as $d_s$ increases. The window function may have any of a variety of functional forms. For example, the window function may be a Gaussian window, a raised cosine window, a Mitchell-Netavali window, a polynomial window, etc. FIG. 17E illustrates a Gaussian window function $w(d_s)$. The Gaussian window may have the form $$w(d_s)=\exp[-(d_s/r)^2],$$

where $\exp[*]$ denotes the exponential function, and r is a scalar value that may depend on the line width parameter $D_L$.

Figure 17F:
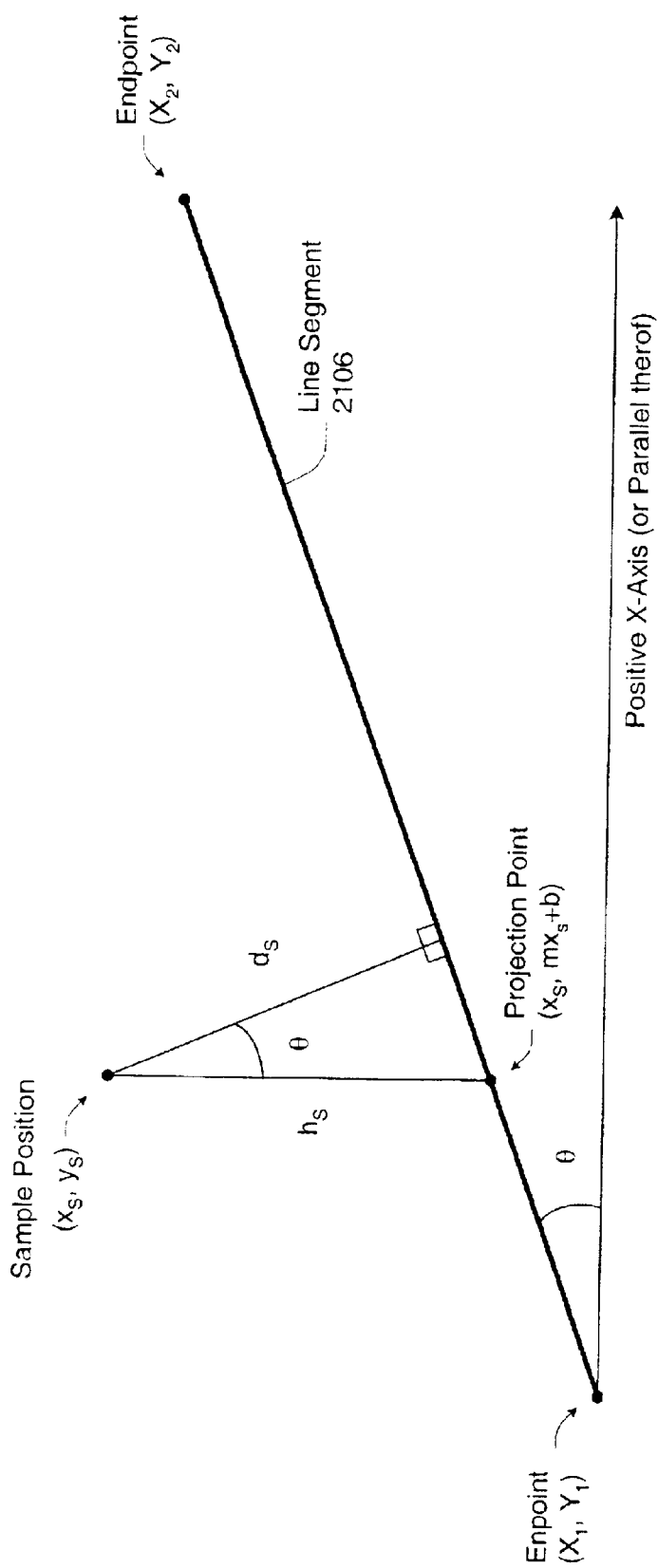
FIG. 17F illustrates one embodiment of a method for computing the sample normal distance for a sample based on the vertical displacement of the sample with respect to the line 2106.

If line segment 2106 is X-Major, rendering unit 150A may compute the sample normal distance $d_s$ from the vertical distance $v_s$ between the sample and the line segment 2106 as suggested by FIG. 17F. In particular, rendering unit 150A may compute the vertical distance $v_s$ according to the expression $$v_s=y_s-(m*x_s+b),$$

where $x_s$ is the x-coordinate of the sample, $y_s$ is the y-coordinate of the sample, and m and b are the slope and intercept respectively of the line segment 2106. Rendering unit 150A may then compute the sample normal distance $d_s$ according to the relation $$d_s=v_s*\cos(\theta),$$

where $\theta$ is the angle between the line segment 2106 and the positive x axis, and $\cos(\theta)$ denotes the cosine of angle $\theta$. It is noted that the value $\cos(\theta)$ depends on the slope m of the line segment 2106, and thus, does not vary from sample to sample. The values of $\cos(\theta)$ for slopes m in the closed interval $[-1,1]$ may pre-computed and stored in a lookup table. Rendering unit 150A may lookup the value $\cos(\theta)$ any time after computing the line slope m. The value $\cos(\theta)$ may be referred to herein as the slope correction factor. It is noted that the angle $\theta$ is presented here for convenience of discussion, and may not be physically computed.

If the line segment 2106 is Y-Major, rendering unit 150A may compute the sample normal distance $d_s$ based on the horizontal distance $h_s$ between the sample and the line segment 2106 using a similar set of computations with the roles of x and y interchanged, and the angle $\theta$ measured from the positive y axis to the line 2106 instead of from the positive x axis.

In one set of embodiments, rendering unit 150A may vary the transparency of samples instead of color. For example, if the line color is blue, rendering unit 150A may assign the color blue to all samples in the line bounding box, and may implement a Gaussian transition of sample transparency values from totally opaque on the line segment 2106 to totally transparent at some normal distance from the line segment 2106. When these samples are written to sample buffer 162, sample buffer 162 may automatically perform transparency blending (i.e. alpha-blending) with respect to samples already stored in sample buffer 162. Thus, the spatial transition of color values from solid blue at the center of the line to ambient colors away from the line may be automatically implemented by the alpha-blending feature of the sample buffer 162. More generally, rendering unit 150A may assign transparency value $\alpha_s$ to a sample (i.e. a sample interior to the line bounding box) according to the relation:

$$\alpha_s=1-w(d_s),$$

where $\alpha_s=0$ denotes total opacity and $\alpha_s=1$ denotes total transparency.

In one embodiment, rendering unit 150A may vary both sample color and sample transparency as a function of sample normal distance with respect to the line segment 2106.

By modulating sample color and/or transparency with a window function, rendering unit 150A achieves an anti-aliasing effect on the line segment 2106. High spatial frequencies in the direction normal to the line segment are removed, and thus, the display device is able to present the line segment 2106 without ringing at the line edges. The anti-aliased line may be more pleasing to the eye of the viewer.

In another embodiment, the window function $w(d_s)$ may be a rectangular function. Thus, rendering unit 150A may not apply any anti-aliasing to the sample values (i.e. color and/or transparency of the samples interior to the line bounding box). However, as described above, sample-to-pixel calculation units 170 performs spatial filtering on groups of sample values to generate pixel values. Thus, the sample-to-pixel calculation units 170 may smooth out the edges of lines before they are presented to the display device.

In step 545, rendering unit 150A may store the sample values (i.e. the sample color values, transparency value, texture values, etc.) in sample buffer 162. If alpha-blending is turned on, sample buffer 162 may automatically perform an alpha-blending (i.e. transparency mixing) operation on the in-coming samples with respect to samples already stored in sample buffer 162. In other words, the color values of an in-coming sample may mix with the color values of an existing sample (i.e. a sample already resident within sample buffer 162) having the same or approximately the same sample position. The amount of mixing may be determined by the transparency value of the in-coming sample. If alpha-blending is turned off, sample buffer 162 may store or discard the in-coming sample depending on the result of a z-comparison between the in-coming sample and the existing sample. If the in-coming sample passes the z-comparison, the sample buffer 162 may overwrite existing samples with the in-coming samples.

In one embodiment, rendering unit 150A comprise one or more processors executing program code which implement any or all of the steps of FIG. 16. In another embodiment, rendering unit 150A may comprise dedicated circuitry (such as an ASIC chip, a gate array, analog circuitry, etc.) for implementing any or all of the steps of FIG. 16. In yet another embodiment, rendering unit 150A may comprise one or processors running some of the steps of FIG. 16, and dedicated hardware implementing the remaining steps of FIG. 16.

Pre-compensation for Anti-aliasing in Convolve Units

As described above, graphics system 112 includes sample-to-pixel calculation units 170 which are configured to read samples values from the sample buffer 162 and perform spatial filtering of the samples values to generate pixel values. The spatial filtering achieves an anti-aliasing effect on graphical objects including lines. However, as described above, rendering unit 150A may perform anti-aliasing on line sample values using a window function. Thus, samples corresponding to lines may be subjected to two waves of anti-aliasing, i.e. the first in the rendering unit 150A and the second in the sample-to-pixel calculation units 170. Therefore, lines may appear wider than originally intended, or excessively "smoothed out".

In one embodiment, lines may be made to appear more consistent with a desired width by employing a narrower window (e.g. a narrower Gaussian window) in the rendering unit 150A. In other words, rendering unit 150A may use a narrower window on samples in line bounding box 2108 to pre-compensate for the "line-expanding" effect of the spatial filtering performed in the sample-to-pixel calculation units 170.

Rendering unit 150A may apply a narrower window to samples while using the same window function w(*) by scaling the sample normal distances $d_s$ by a scalar value C greater than one before evaluating the window function. For example, rendering unit 150A may assign transparency value $\alpha_s$ to a sample according to the relation $$\alpha_s = 1 - w(C^* d_s).$$

Because scalar value C is greater than one, sample transparency values $\alpha_s$ more quickly transition from one to zero as sample normal distance increases. The scalar value C may be referred to herein as the anti-aliasing correction factor (ACF).

In another embodiment, rendering unit 150A may apply the narrower window to sample color vectors according to the relation $$(R,G,B)_s = w(C^* d_s)^*(R,G,B)_L + (1 - w(C^* d_s))^*(R,G,B)_{BG}.$$

Because anti-aliasing correction factor C is greater than one, the sample color vector more quickly transitions from the line color to the background color as the sample normal distance increases.

In some embodiments, the anti-aliasing correction factor ACF may be determined empirically. In other embodiments, the anti-aliasing correction factor C may be controlled by user input. In one embodiment, a certain initial value may be chosen for the ACF, the object (e.g., the line segment) may be observed on the display, and the value of the ACF may be adjusted so that the observed width of the object matches a desired width. For example, host CPU 102 may support a graphical user interface which allows the user to control the value of anti-aliasing correction factor C. The graphical user interface may transmit an indication of the desired anti-aliasing correction factor C (or an indication of a desired change in the anti-aliasing correction factor C) to graphics system 112 in response to a user input event. For example, the user may manipulate a graphical control knob or slider with an input device (such as mouse 88) to change the value of anti-aliasing correction factor C. The user may increase and/or decrease the anti-aliasing correction factor C until the lines displayed on a display device (e.g. display device 84A or 84B, or any of projection devices $PD_1$ through $PD_G$) have a satisfactory appearance.

In one embodiment, graphics system 112 may include an input device (e.g. a control knob coupled to a variable potentiometer or variable capacitor) dedicated for controlling the anti-aliasing correction factor C in addition to or instead of the software control provided by the graphical user interface.

Figure 18:
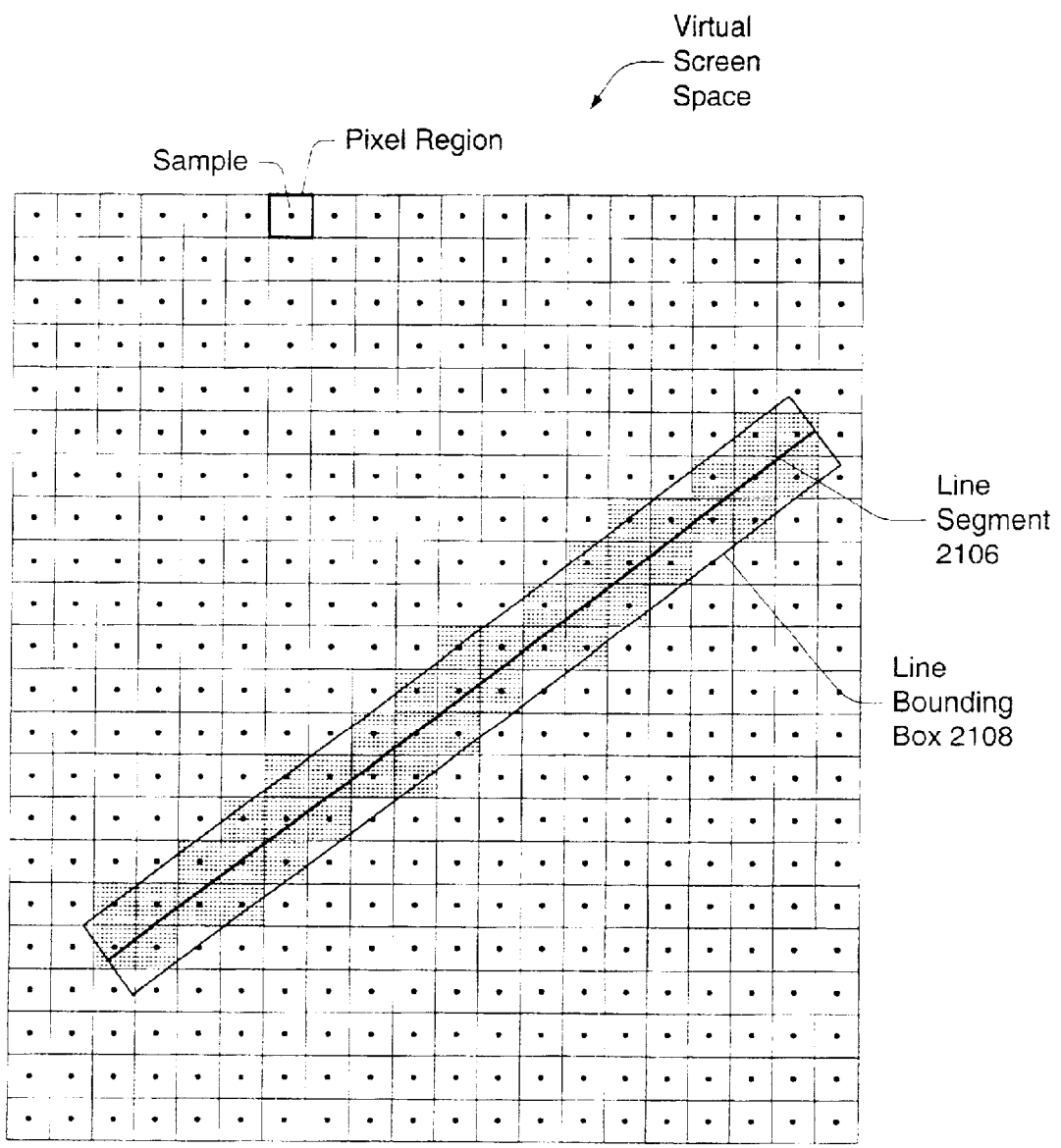
FIG. 18 illustrates one embodiment of a method for turning on/off sample values based on their position inside/outside the line bounding box 2108.

FIG. 18 shows a distribution of samples in virtual screen space in a non-supersampled embodiment of graphics system 112. Rendering units 150 may be configured to generate one sample per pixel. A pixel grid is superimposed over the virtual screen space in FIG. 18 to illustrate that one sample is allocated per pixel region. The small black dots represent the samples, and the small squares represent pixel regions. It is noted that the graphics system may render the line segments with different widths. In one embodiment, to rasterize line segment 2106, the pixels whose centers are located within line bounding box 2108 are illuminated. In this embodiment, the long edges of line bounding box 2108 are located 1 pixel on either side of line 2106. Thus, a line having a width of 2 pixels is rasterized around line segment 2106.

It is apparent from FIG. 18 that line segments other than vertical or horizontal line segments may appear jaggy when drawn using a rectangular grid. The sample anti-aliasing techniques described above may be used in order for the line segment 2106 to appear less jaggy. In one embodiment, instead of illuminating samples within certain boundaries and not illuminating pixels outside those boundaries, rendering unit 150A may modulate sample color and/or transparency with a window function that varies in the direction normal to the line segment 2106. The modulation induced by the window function may generate a more pleasing image by smoothing jaggies.

Even in those embodiments where one sample is allocated per pixel region, a sample-to-pixel calculation unit may filter more than one sample to generate a given pixel value. In other words, the filter kernel for a sample-to-pixel calculation unit may span more than one pixel region. Thus, even in non-supersampled embodiments, rendering unit 150A may implement line-width pre-compensation to sample color and/or transparency value as described above by multiplying sample normal distances $d_s$ by the anti-aliasing correction factor C, and evaluating the window function value on the scaled distance $C*d_s$.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for displaying lines on a display device, said method comprising:
   generating a plurality of sample positions in a two-dimensional space, wherein the plurality of sample positions correspond to a pixel;
   determining a sample normal distance for each of the sample positions with respect to a line in the two-dimensional space;
   assigning a plurality of sample values to said plurality of sample positions based on the sample normal distance of each of said sample positions, wherein said assigning comprises:
      determining a window value according to a window function for each of said sample positions based on the corresponding sample normal distance, wherein said determining said window value according to said window function for each of said sample positions comprises: multiplying the sample normal distance of each sample position by an anti-aliasing correction factor (ACF) to determine a corresponding scaled distance value; and evaluating said window function at the first scaled distance value;
      computing said sample value for each of said sample positions based on the corresponding window value;
   operating on said plurality of sample values to determine a pixel value for the pixel;
   transmitting the pixel value to a display device.

2. The method of claim 1, wherein said sample value comprise color values.

3. The method of claim 1, wherein said sample values comprise transparency values.

4. The method of claim 1, wherein said operating on said plurality of sample values comprises:
   spatially filtering said plurality of sample values.

5. The method of claim 1, wherein said determining said sample normal distance for each of the sample positions with respect to said line comprises:
   computing a vertical displacement between the sample position and the line; and
   multiplying the vertical displacement by a slope correction factor.

6. The method of claim 1, wherein said determining said sample normal distance for each of the sample positions with respect to said line comprises:
   computing a horizontal displacement between the sample position and the line; and
   multiplying the horizontal displacement by a slope correction factor.

7. The method of claim 1, wherein said ACF is greater than one.

8. The method of claim 1, wherein said multiplying the sample normal distance of each sample position by said ACF reduces an apparent width of said line on the displace device.

9. The method of claim 1, further comprising receiving user input determining said ACF.

10. The method of claim 1, wherein the window function is a Gaussian function.

11. The method of claim 1, wherein the window function approaches zero as said sample normal distance increases.

12. The method of claim 1, wherein the window function attains a value of one for said sample normal distance equal to zero.

13. A graphics system for displaying lines on a display device, the graphics system comprising:
   a sample buffer;
   a rendering unit configured to (a) generate a plurality of sample positions in a two-dimensional space, wherein the plurality of sample positions correspond to a pixel, (b) determine a sample normal distance for each of the sample positions with respect to a line in the two-dimensional space, (c) assign sample values to said sample positions based on the sample normal distance of each of said sample positions, and (d) store said sample values in said sample buffer;
   a pixel calculation unit configured to read said sample values from the sample buffer, operate on said sample values to determine a pixel value for the pixel, and transmit the pixel value to a display device;
   wherein said rendering unit is configured to assign sample value to said sample positions based on the sample normal distance of each sample position by:
      determining a window value according to a window function for each of said sample positions based on the corresponding sample normal distance; and
      computing said sample value for each of said sample positions based on the corresponding window value;
   wherein said rendering unit is configured to determine said window value according to said window function for each of said sample positions by:
      multiplying the sample normal distance of each sample position by an anti-aliasing correction factor (ACF) to determine a corresponding scale distance value; and
      evaluating said window function at the first scaled distance value.

14. The graphics system of claim 13, wherein said sample values comprise color values.

15. The graphics system of claim 13, wherein said sample values comprise transparency values.

16. The graphics system of claim 13, wherein said pixel calculation unit is configured to operate on said sample values by spatially filtering said sample values.

17. The graphics system of claim 13, wherein said rendering unit is configured to determine said sample normal distance for each of the sample positions with respect said line by:
   computing a vertical displacement between the sample position and the line; and
   multiplying the vertical displacement by a slope correction factor.

18. The graphics system of claim 13, wherein said rendering unit is configured to determine said sample normal distance for each of the sample positions with respect to said line by:
   computing a horizontal displacement between the sample position and the line; and
   multiplying the horizontal displacement by a slope correction factor.

19. The graphics system of claim 13, wherein said AC is greater than one.

20. The graphics system of claim 13, wherein said multiplying the sample normal distance of each sample position by said ACF reduces an apparent width of said line on the displace device.

21. The graphics system of claim 13, wherein said rendering unit is further configured to receive user input determining said ACF.

22. The graphics system of claim 13, wherein the window function is a Gaussian function.

23. The graphics system of claim 13, wherein the window function approaches zero as said sample normal distance increases.

24. The graphics system of claim 13, wherein the window function attains a value of one for said sample normal distance equal to zero.

* * * * *

UNITED STATES PATENT AND TRADEMARK OFFICE
CERTIFICATE OF CORRECTION

PATENT NO. : 6,947,057 B2
DATED : September 20, 2005
INVENTOR(S) : Nelson et al.

It is certified that error appears in the above-identified patent and that said Letters Patent is hereby corrected as shown below:

Column 35,
Line 1, delete "wherein said AC is" and substitute -- wherein said ACF is --.

Signed and Sealed this

Twentieth Day of December, 2005

JON W. DUDAS
*Director of the United States Patent and Trademark Office*